(12) United States Patent
Kanematsu

(10) Patent No.: US 11,847,102 B2
(45) Date of Patent: Dec. 19, 2023

(54) DATA VIRTUALIZATION APPARATUS AND METHOD

(71) Applicant: KABUSHIKI KAISHA TOSHIBA, Tokyo (JP)

(72) Inventor: Mototaka Kanematsu, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 17/651,836

(22) Filed: Feb. 21, 2022

(65) Prior Publication Data

US 2022/0374400 A1    Nov. 24, 2022

(30) Foreign Application Priority Data

May 20, 2021    (JP) ................. 2021-085266

(51) Int. Cl.
*G06F 16/21* (2019.01)
*G06F 16/25* (2019.01)
*G06F 16/22* (2019.01)

(52) U.S. Cl.
CPC ........ *G06F 16/213* (2019.01); *G06F 16/2282* (2019.01); *G06F 16/256* (2019.01)

(58) Field of Classification Search
CPC ... G06F 16/213; G06F 16/2282; G06F 16/256
See application file for complete search history.

(56) References Cited

U.S. PATENT DOCUMENTS

| | | | | |
|---|---|---|---|---|
| 2013/0198243 A1* | 8/2013 | Givens | .................... | G06F 9/451 707/805 |
| 2014/0067792 A1* | 3/2014 | Erdogan | ................. | G06F 16/27 707/718 |
| 2019/0236169 A1* | 8/2019 | Nambiar | ................ | G06F 16/221 |
| 2020/0004757 A1 | 1/2020 | Hirose et al. | | |
| 2020/0012741 A1* | 1/2020 | Bracholdt | ............. | G06F 16/288 |
| 2020/0034362 A1* | 1/2020 | Galitsky | ........... | G06F 16/24522 |
| 2021/0034433 A1* | 2/2021 | Mayrack | ................ | G06F 9/5083 |

FOREIGN PATENT DOCUMENTS

| JP | 6523823 B2 | 6/2019 |
|---|---|---|
| JP | 2020-004339 A | 1/2020 |
| JP | 2020-134961 A | 8/2020 |
| JP | 2022-014633 A | 1/2022 |

OTHER PUBLICATIONS

Kanematsu, "Data Virtualization", Mar. 30, 2021, 8 pages (with English Machine Translation).

* cited by examiner

*Primary Examiner* — Dangelino N Gortayo
(74) *Attorney, Agent, or Firm* — Oblon, McClelland, Maier & Neustadt, L.L.P.

(57) ABSTRACT

According to one embodiment, a data virtualization apparatus includes a memory and a processor. The processor is configured to acquire first schema information including a first table name of a first source table managed in a first data source, and second schema information including a second table name of a second source table managed in a second data source, convert the first table name into a third table name, and convert the second table name into a third table name, and register first table correspondence information including the first table name and the third table name in the memory, and register second table correspondence information including the second table name and the third table name in the memory.

12 Claims, 29 Drawing Sheets

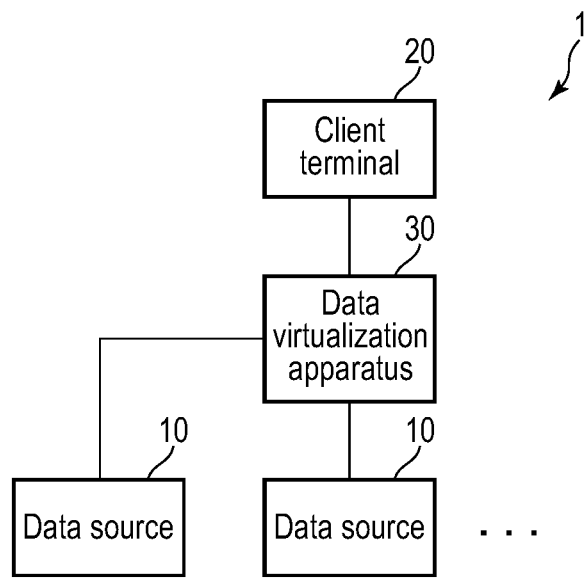
F I G. 1
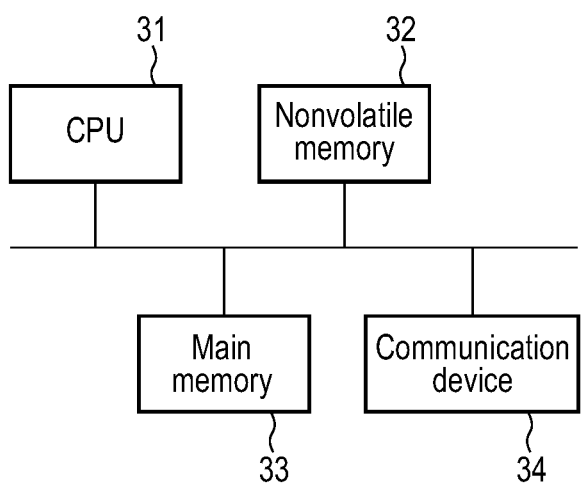
F I G. 2

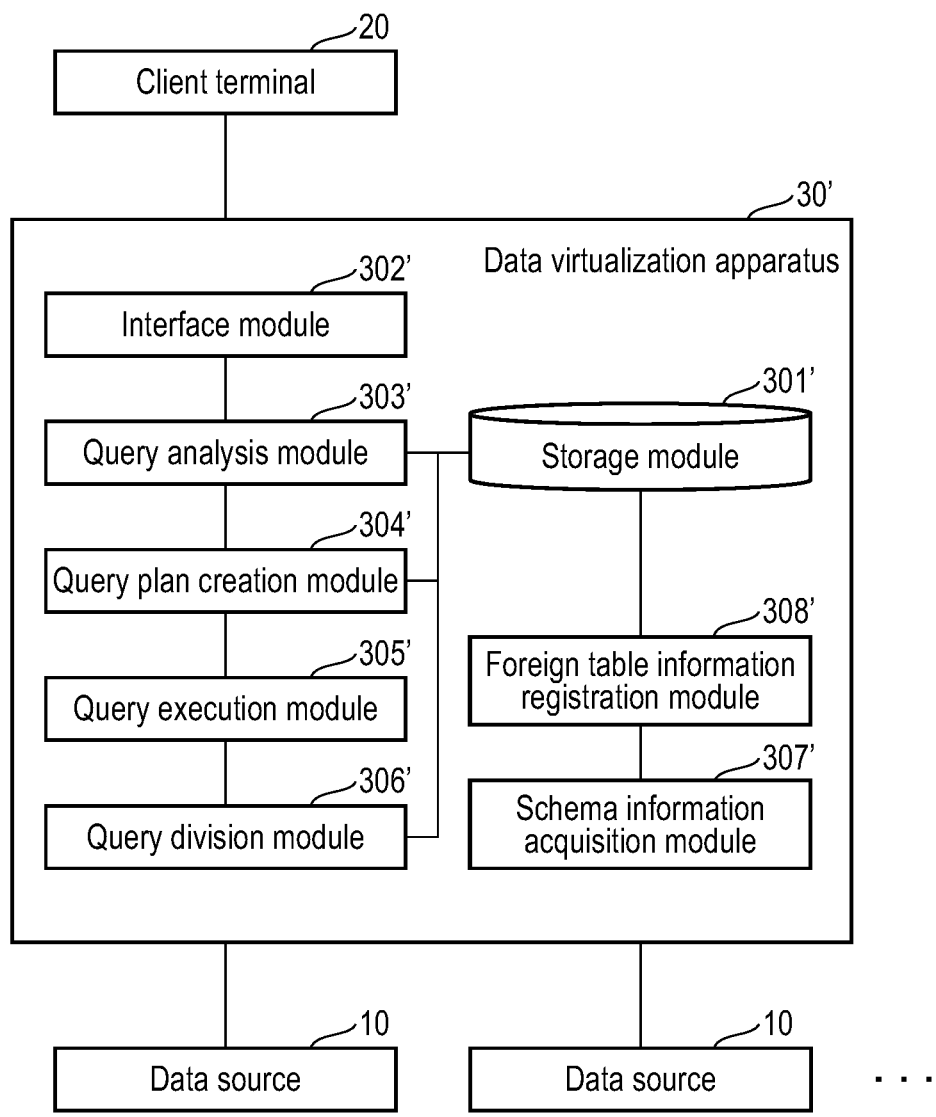
F I G. 3

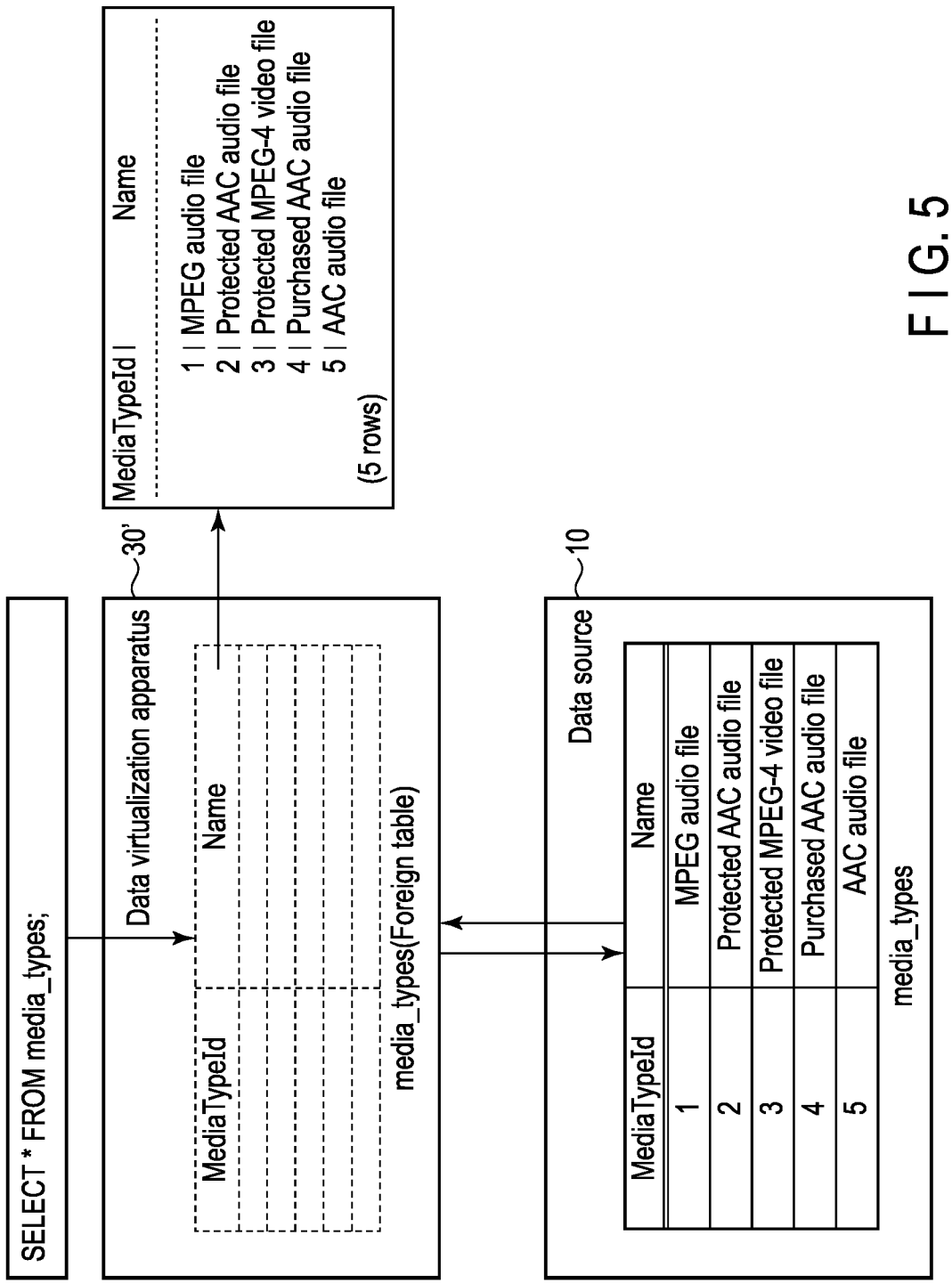
F I G. 5

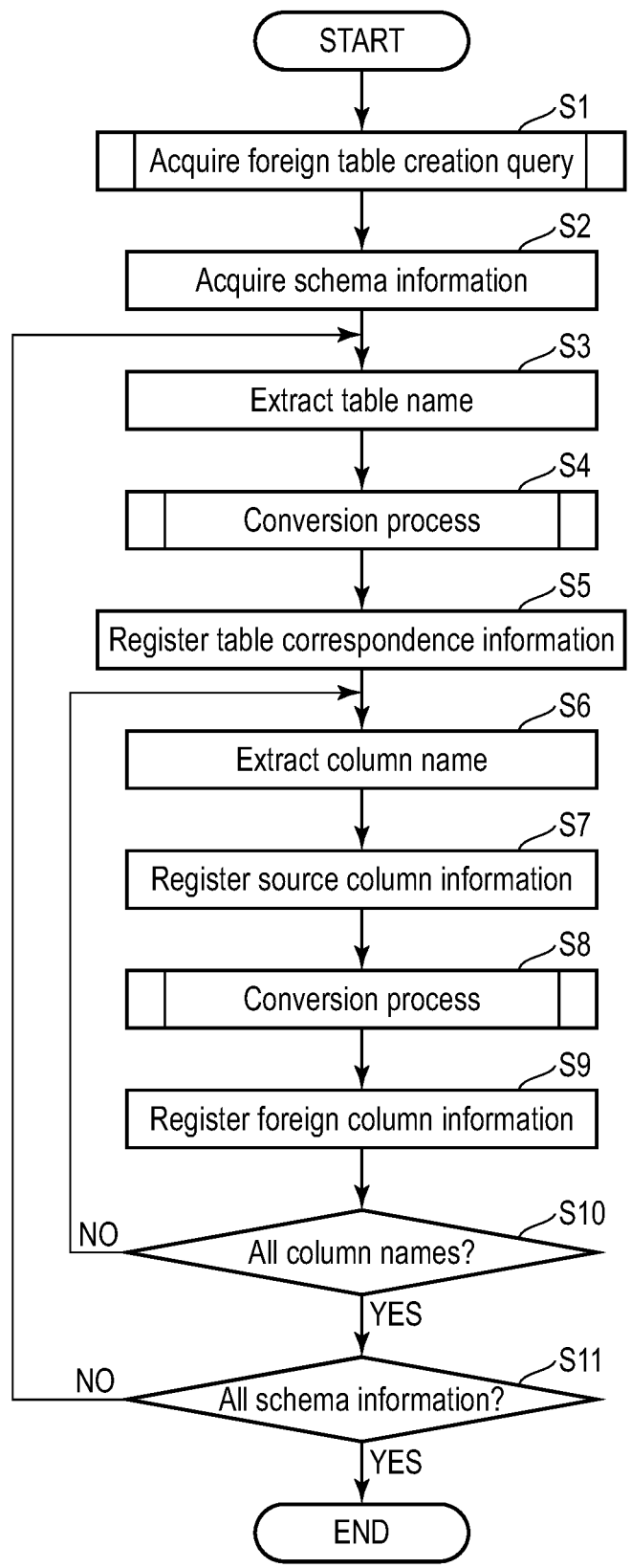
F I G. 8

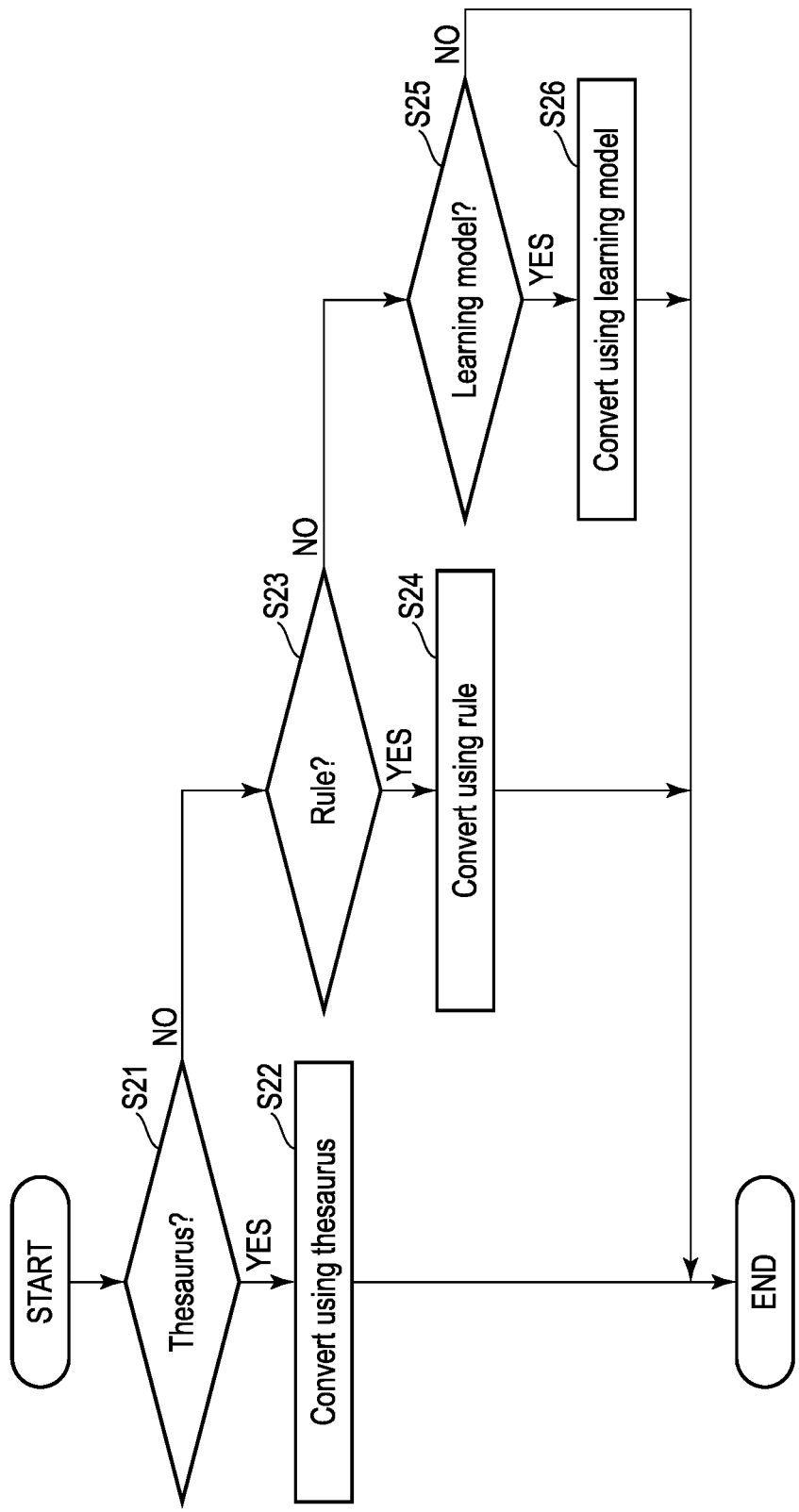
F I G. 9

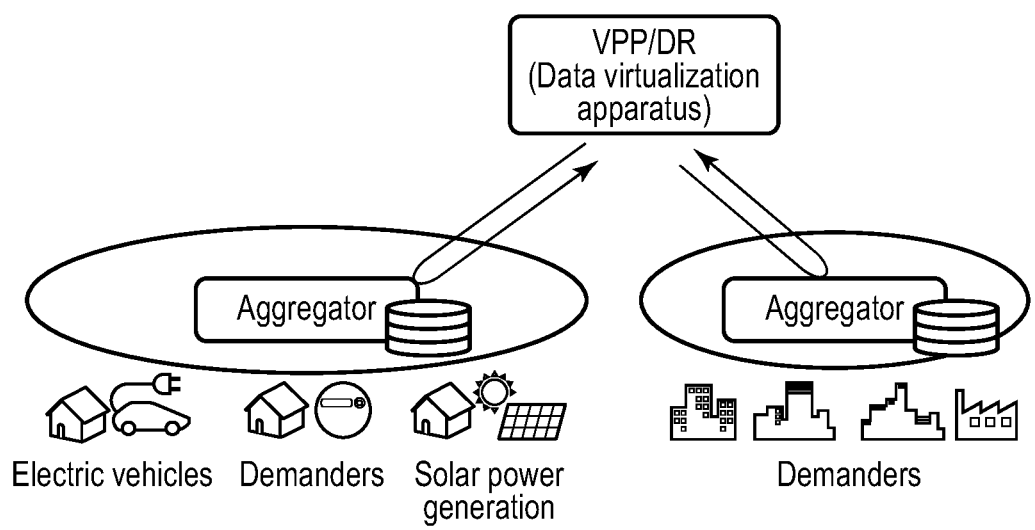
F I G. 11

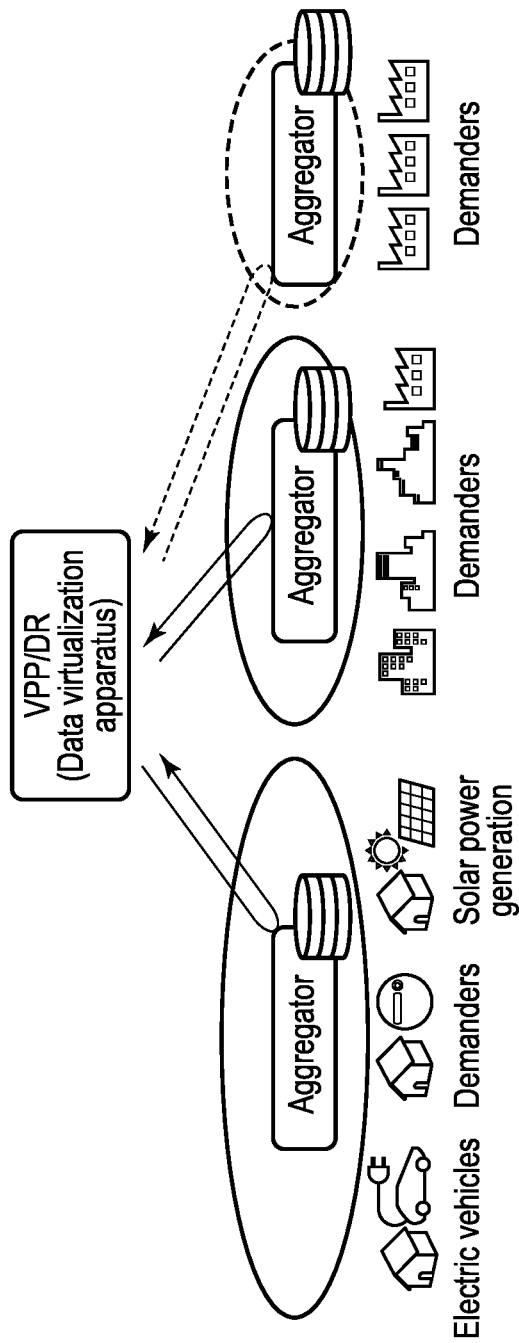
F I G. 12

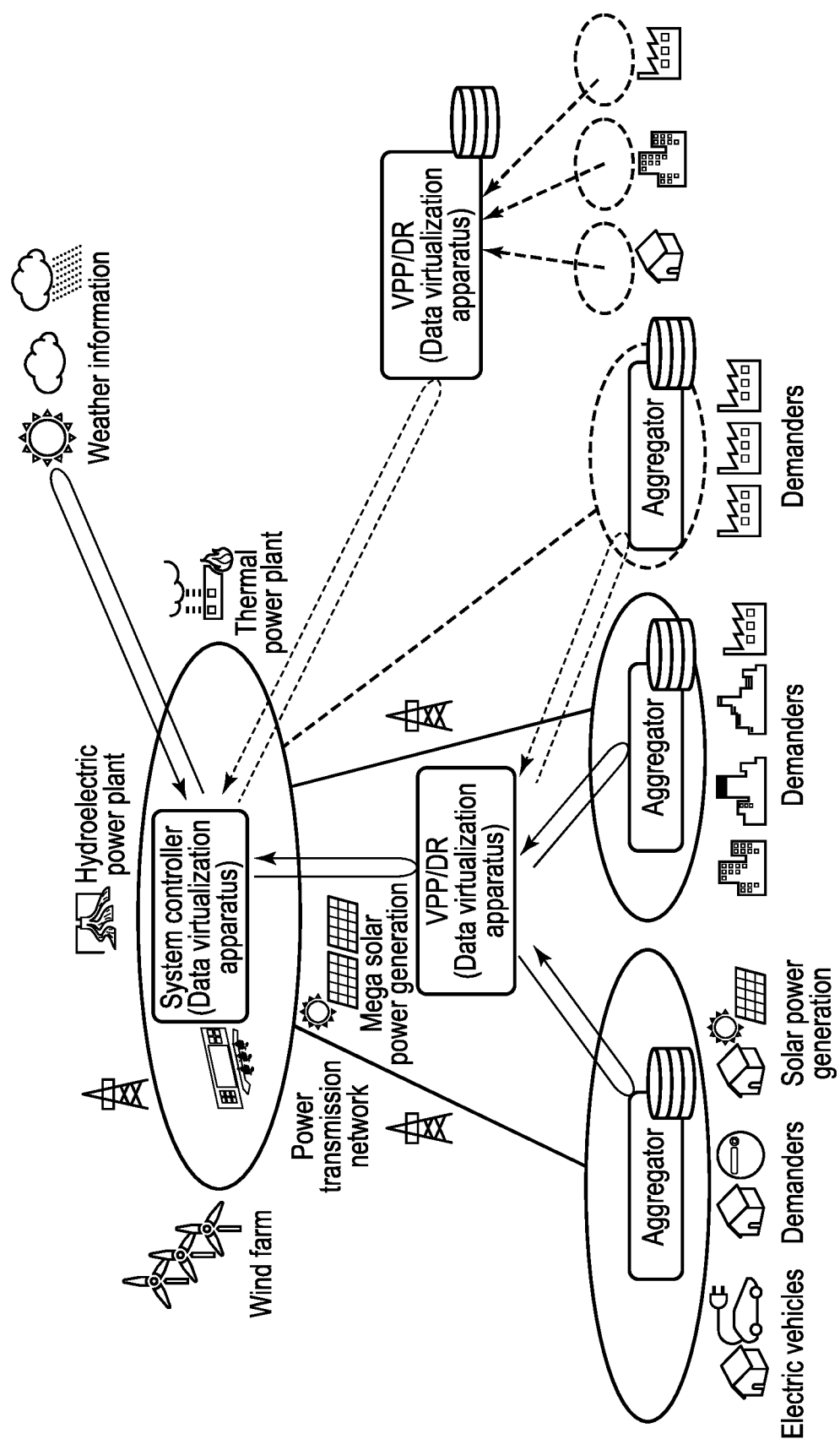
F I G. 13

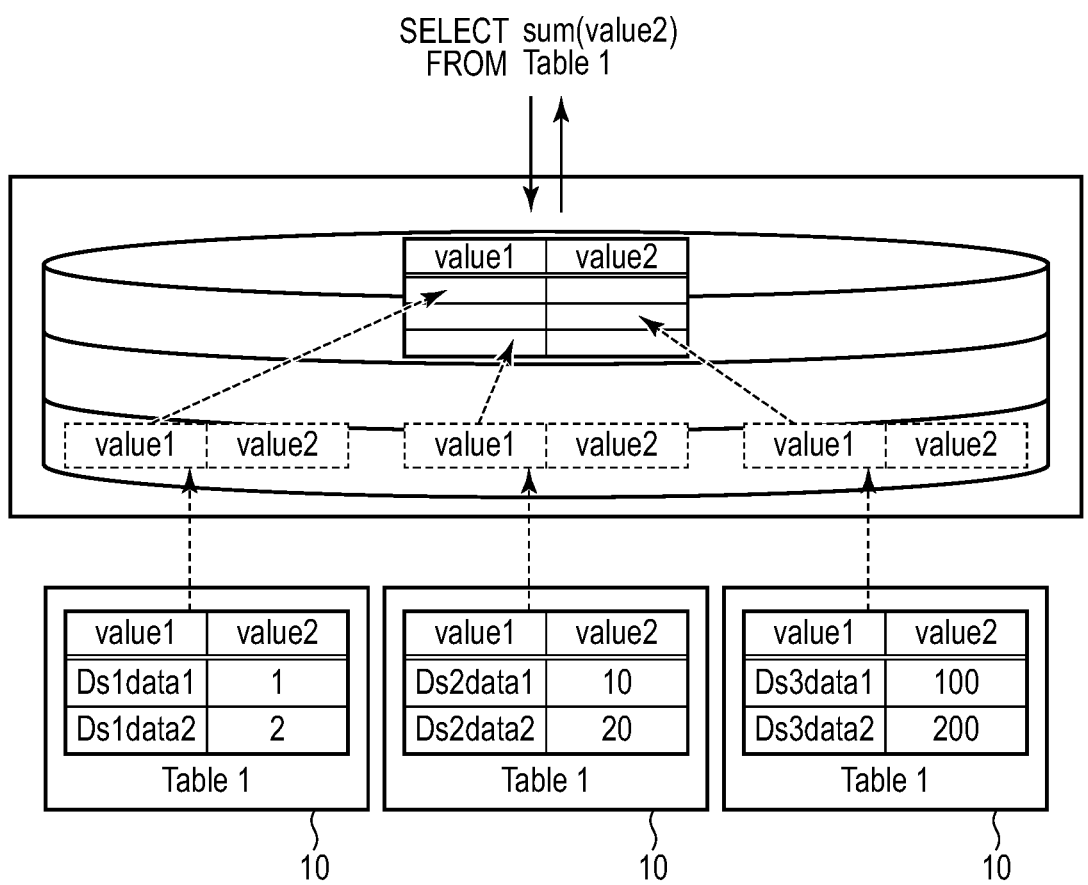
F I G. 14

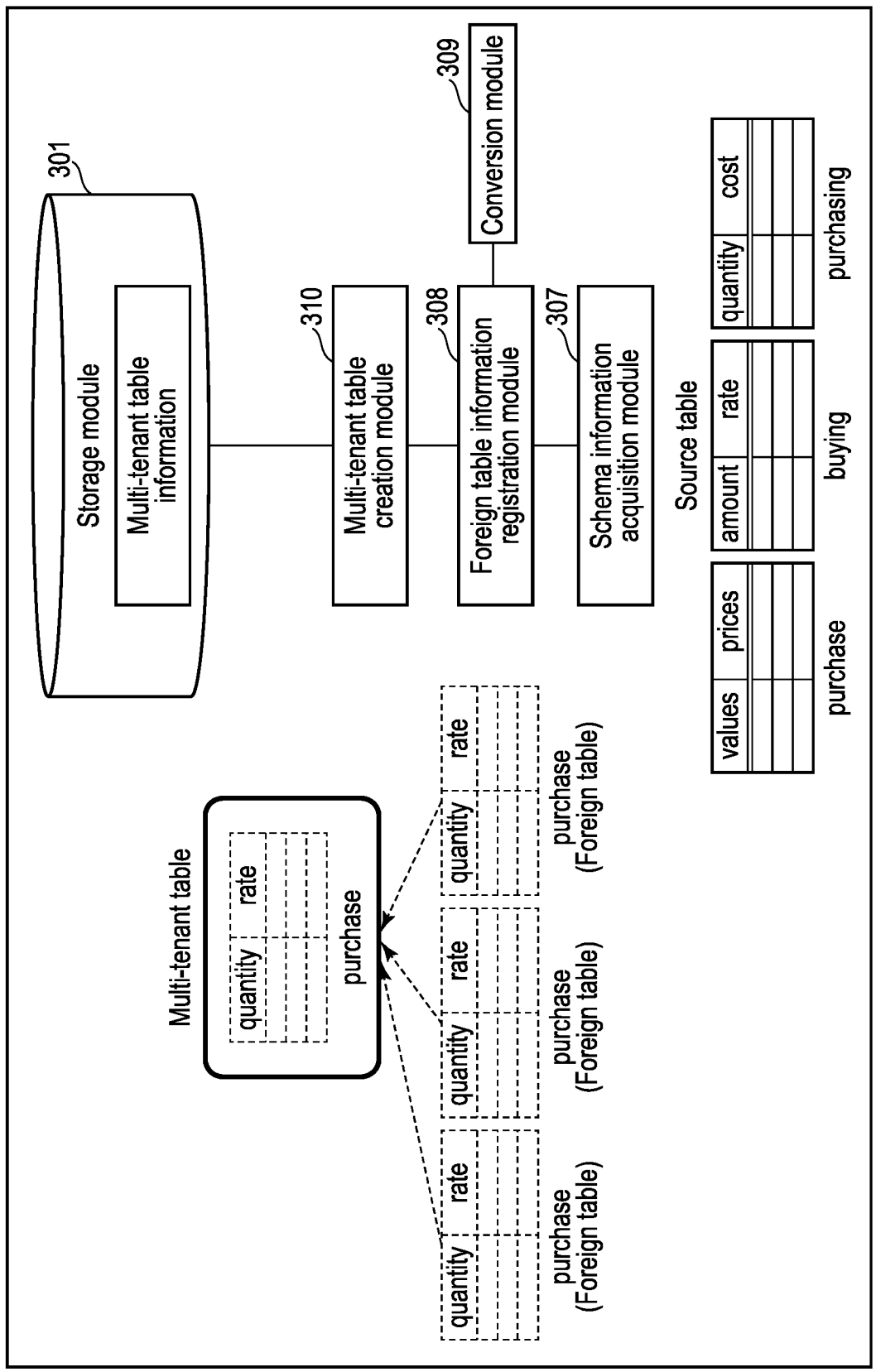
F I G. 16

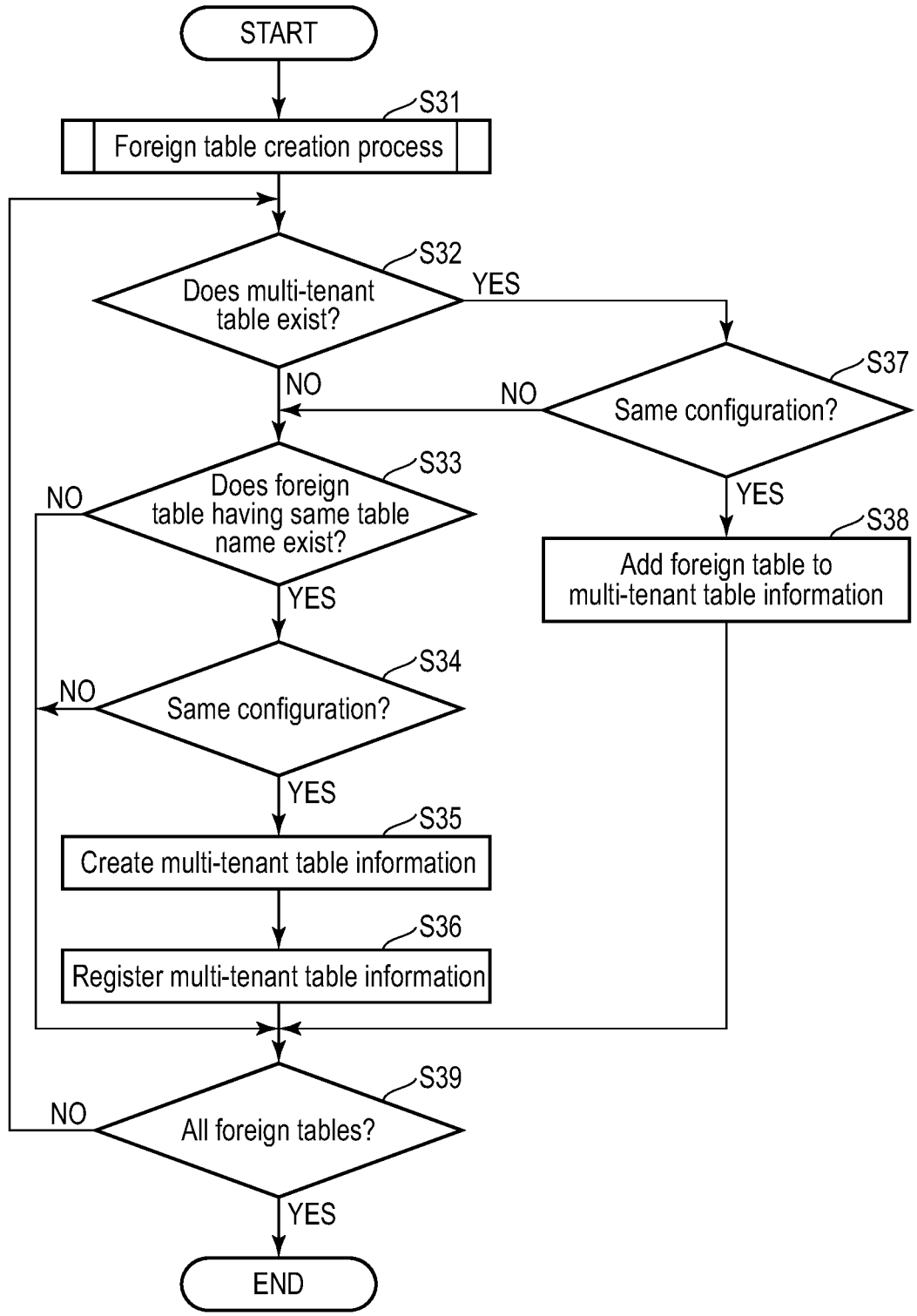
F I G. 17

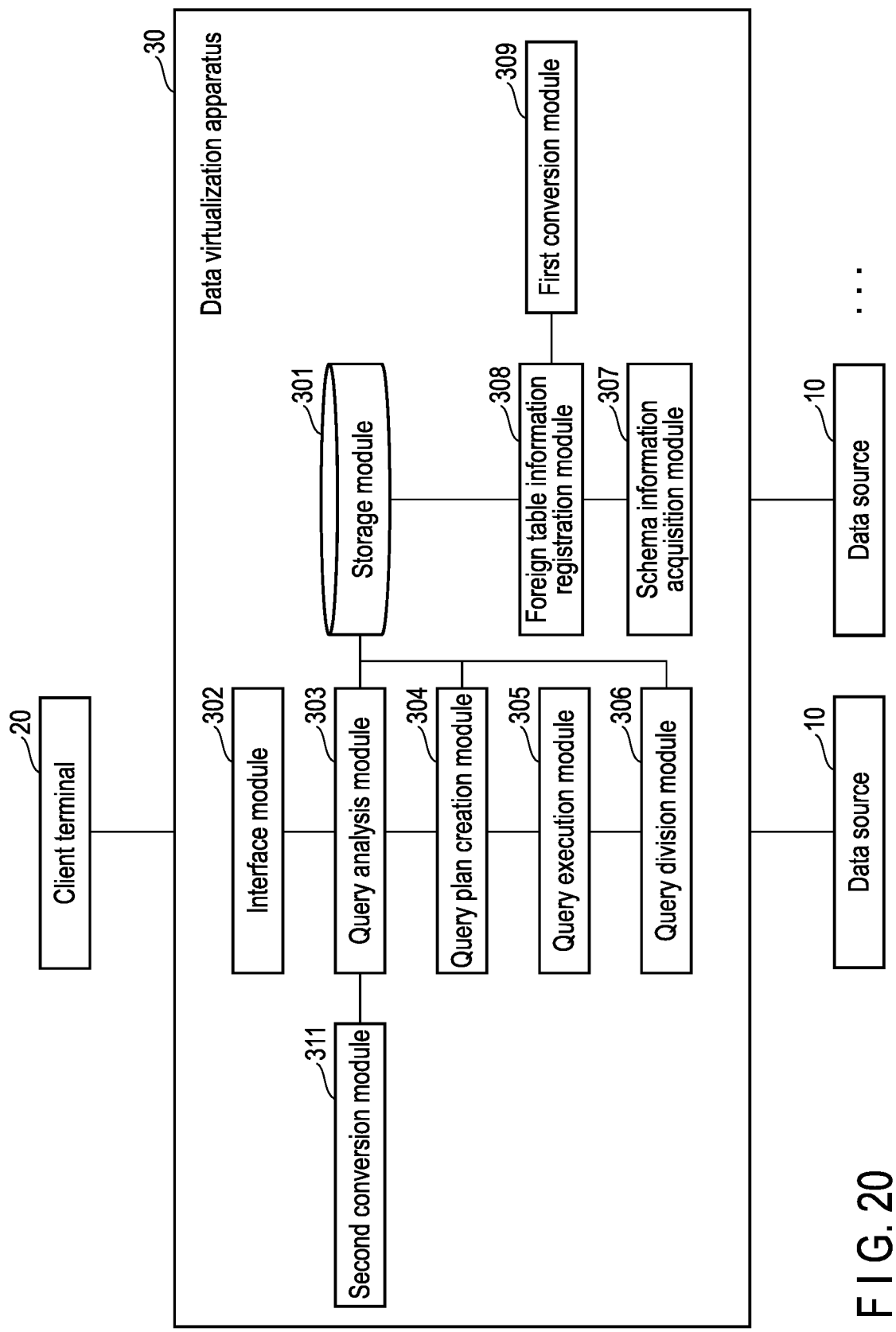
F I G. 20

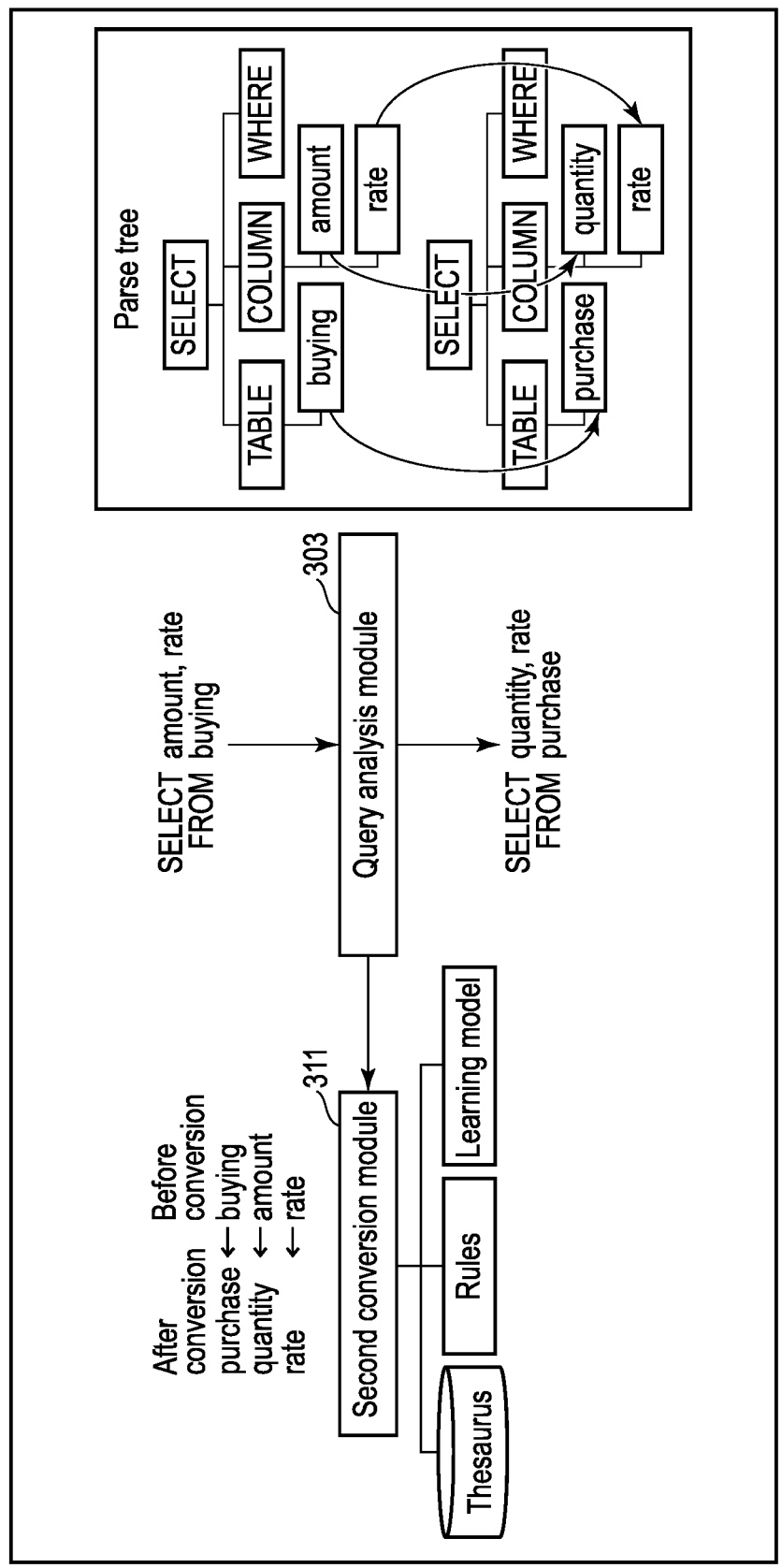
F I G. 21

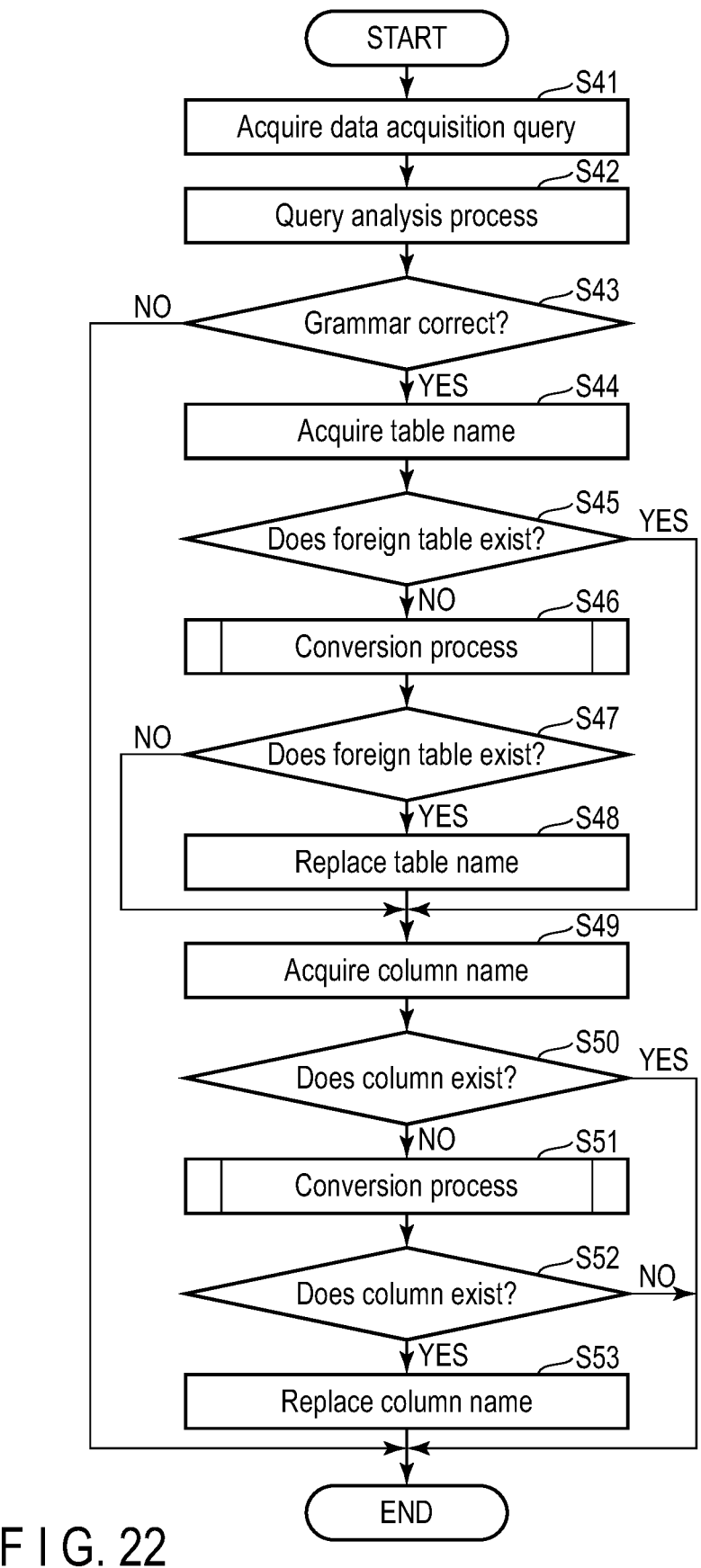
F I G. 22

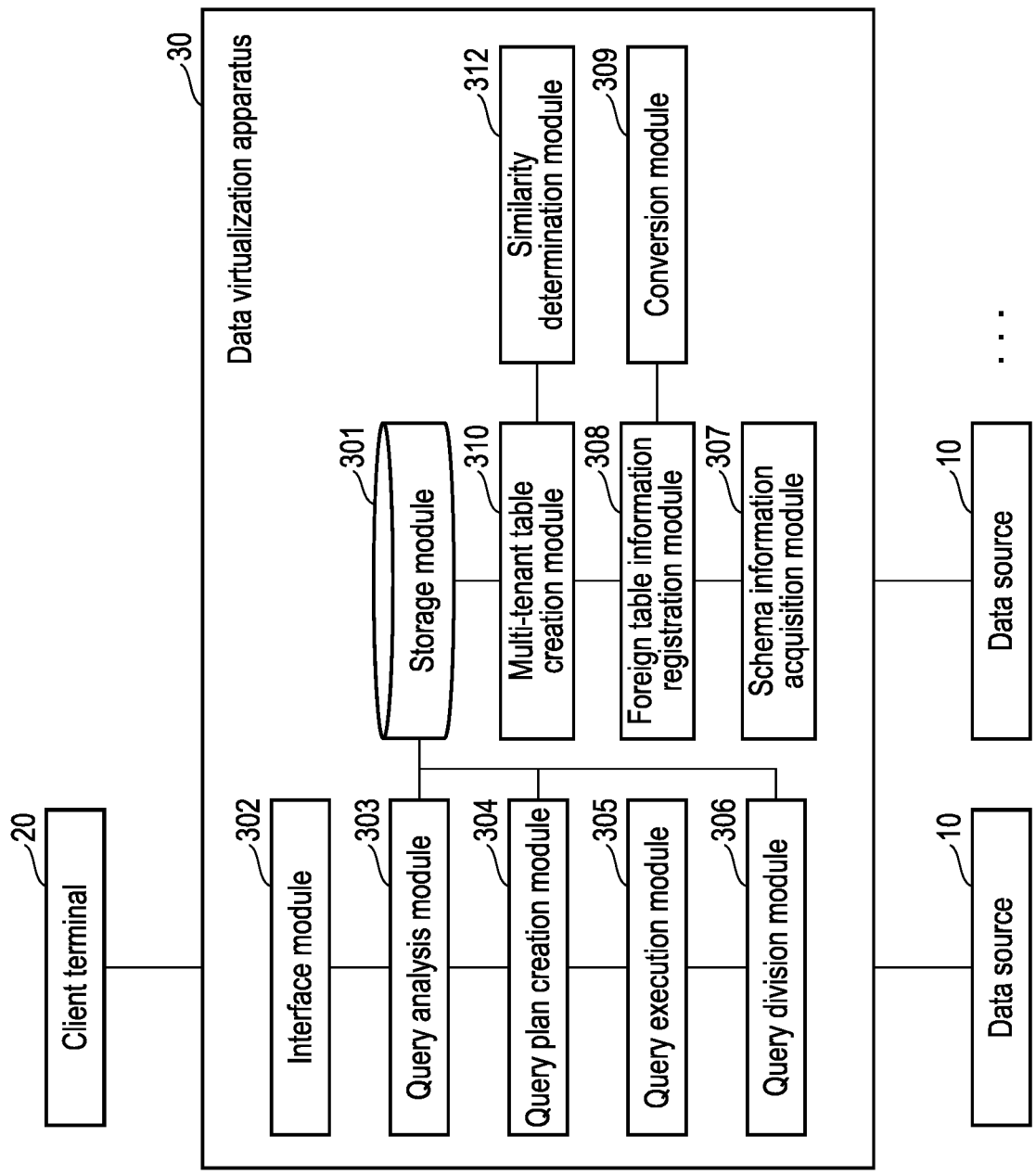
F I G. 24

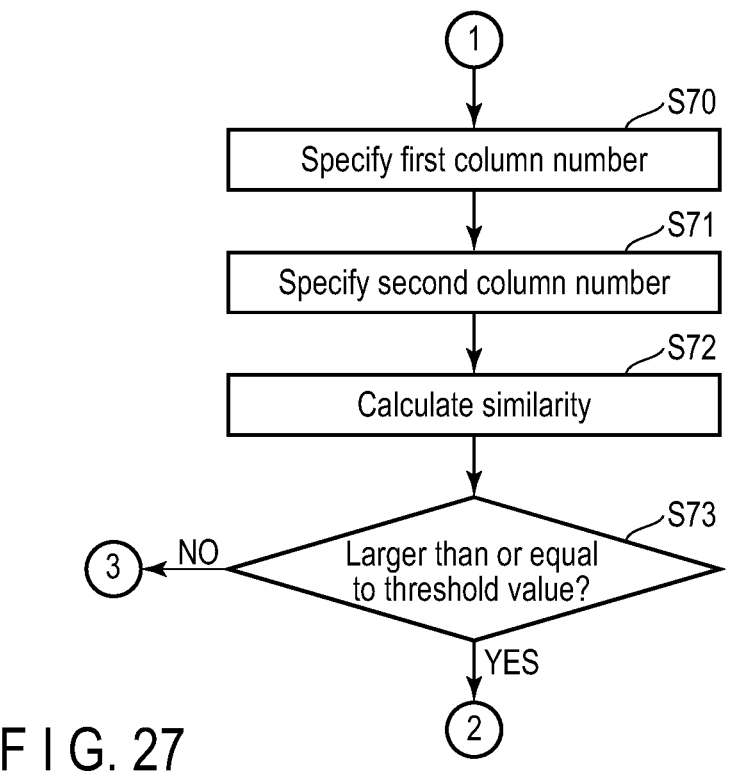
F I G. 27
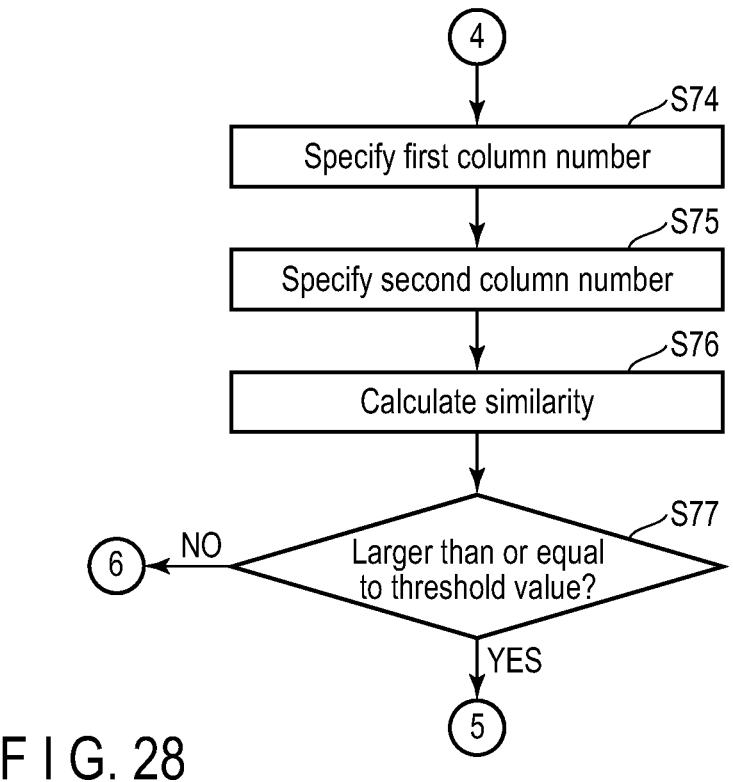
F I G. 28

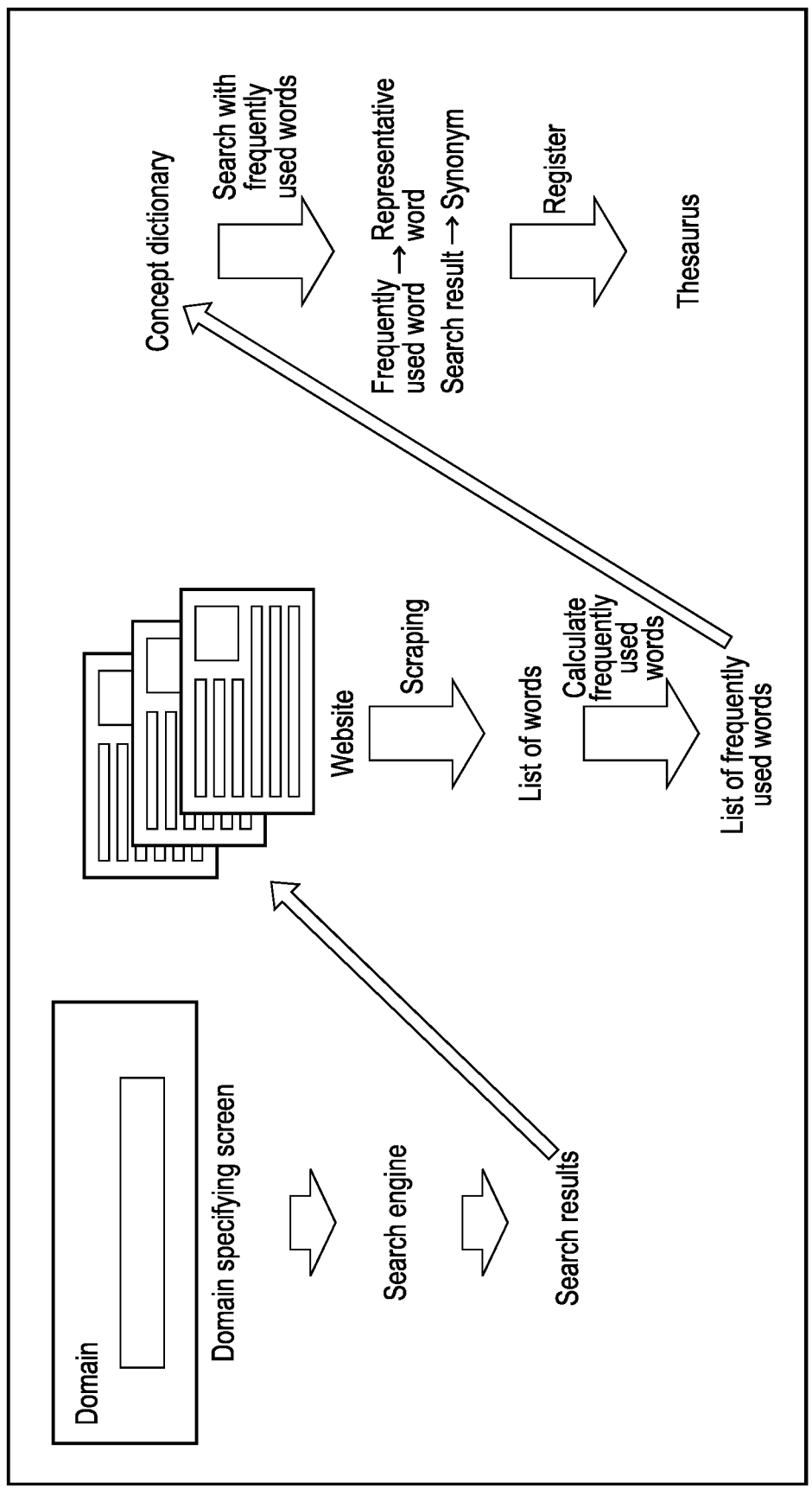
F I G. 32

DATA VIRTUALIZATION APPARATUS AND METHOD

CROSS-REFERENCE TO RELATED APPLICATIONS

This application is based upon and claims the benefit of priority from Japanese Patent Application No. 2021-085266, filed May 20, 2021, the entire contents of which are incorporated herein by reference.

FIELD

Embodiments described herein relate generally to a data virtualization apparatus and a method.

BACKGROUND

In recent years, a technology called data virtualization (data integration solution) has been known, which virtually integrates real data scattered in a plurality of data sources without duplicating the data and provides, for example, data that can be utilized in fields such as business.

In a data virtualization apparatus that realizes such data virtualization, a virtualized table (foreign table) that does not hold the real data is created based on schema information in which a structure of a table managed as the real data in each data source (such as a table name of the table and a column name of a column constituting the table) is defined. The user can thereby access the tables managed in the respective data sources without distinguishing the tables, through the virtualized table created in the data virtualization apparatus.

However, if the same type of data is handled in the tables managed in the respective data sources and if the table names of the tables and the like are defined in different notations, the tables cannot be accessed efficiently in some cases.

BRIEF DESCRIPTION OF THE DRAWINGS

FIG. 1 is a diagram showing an example of a network architecture of a data virtualization system in a first embodiment.

FIG. 2 is a diagram showing an example of the hardware configuration of the data virtualization apparatus.

FIG. 3 is a diagram showing an example of a functional configuration of the data virtualization apparatus according to a comparative example of the embodiment.

FIG. 5 is a diagram showing an outline of operations of the data virtualization apparatus upon acquiring data via a foreign table.

FIG. 8 is a flowchart showing a procedure of the data virtualization apparatus upon creating a foreign table.

FIG. 9 is a flowchart showing an example of a procedure of a conversion process.

FIG. 11 is a diagram illustrating an example of an aspect of use of the data virtualization apparatus.

FIG. 12 is a diagram illustrating an example of an aspect of use of the data virtualization apparatus.

FIG. 13 is a diagram illustrating an example of an aspect of use of the data virtualization apparatus.

FIG. 14 is a diagram illustrating an example of a multi-tenant function which a data virtualization apparatus according to a second embodiment includes.

FIG. 16 is a diagram illustrating an outline of operations of the data virtualization apparatus upon creating a multi-tenant table.

FIG. 17 is a flowchart showing an example of a procedure of the data virtualization apparatus upon creating a multi-tenant table.

FIG. 20 is a block diagram showing an example of a functional configuration of the data virtualization apparatus according to a third embodiment.

FIG. 21 is a diagram illustrating an outline of operations of the data virtualization apparatus upon translating a table name and a column name included in a data acquisition query.

FIG. 22 is a flowchart showing an example of a procedure of the data virtualization apparatus upon specifying a data acquisition query at a client terminal.

FIG. 24 is a block diagram showing an example of a functional configuration of the data virtualization apparatus according to a fourth embodiment.

FIG. 27 is a flowchart showing an example of a procedure of the data virtualization apparatus upon creating a multi-tenant table.

FIG. 28 is a flowchart showing an example of a procedure of the data virtualization apparatus upon creating a multi-tenant table.

FIG. 32 is a diagram illustrating an outline of operations of the data virtualization apparatus upon creating a thesaurus.

DETAILED DESCRIPTION

Figure 4:
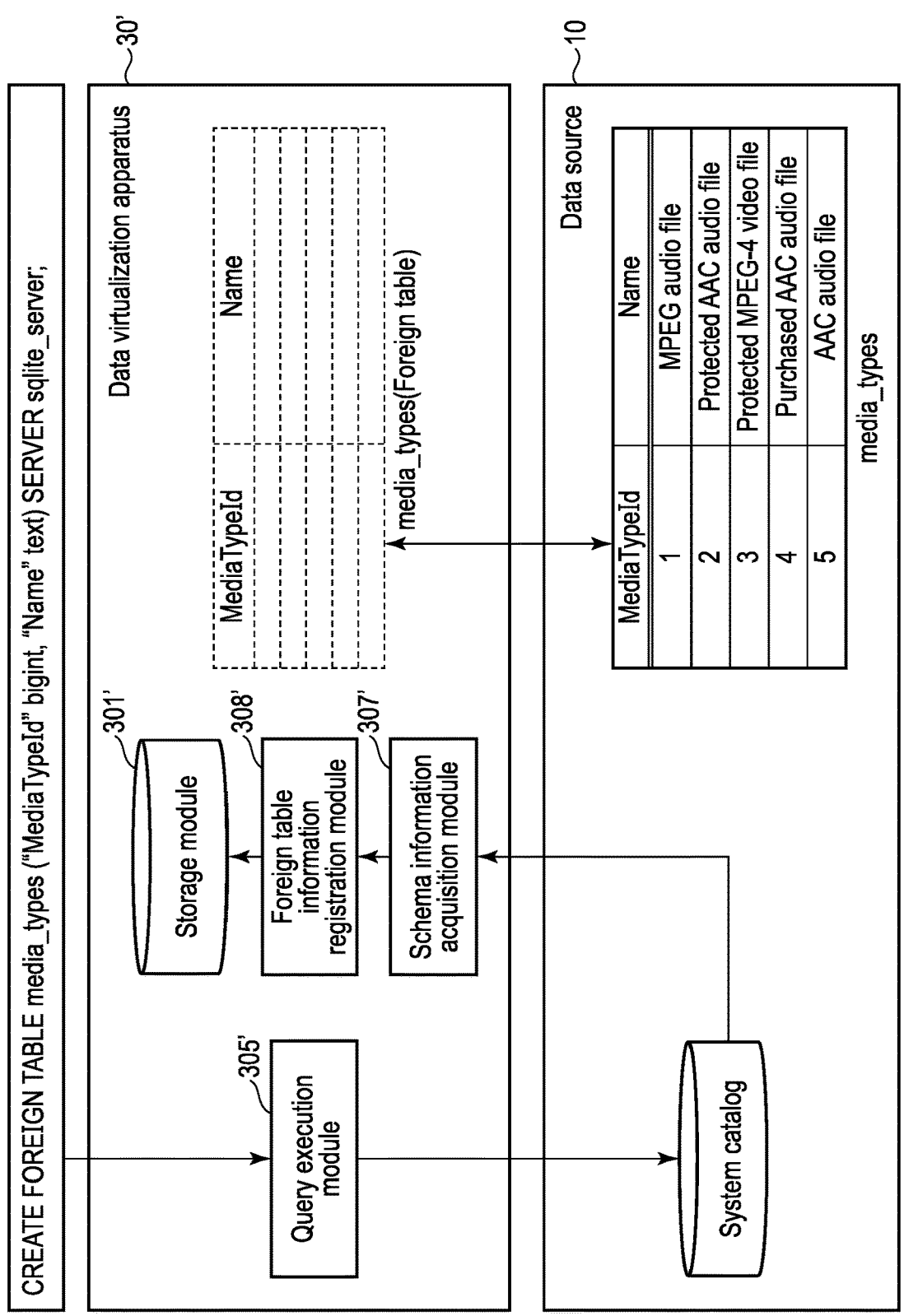
FIG. 4 is a diagram showing an outline of operations of the data virtualization apparatus upon creating a foreign table.

In general, according to one embodiment, a data virtualization apparatus connected to first and second data sources is provided. The apparatus includes a memory and a processor. The processor is configured to acquire first schema information including a first table name of a first source table managed in the first data source, and second schema information including a second table name of a second source table managed in the second data source; convert the first table name included in the acquired first schema information into a third table name, and convert the second table name included in the acquired second schema information into a third table name; and register first table correspondence information including the first table name and the third table name converted from the first table name in association with each other, in the memory, to create a first foreign table corresponding to the first source table, and register second table correspondence information including the second table name and the third table name converted from the second table name in association with each other, in the memory, to create a second foreign table corresponding to the second source table.

Various embodiments will be described hereinafter with reference to the accompanying drawings.

First Embodiment

FIG. 1 is a diagram showing an example of a network architecture of a data virtualization system in a first embodiment. As shown in FIG. 1, a data virtualization system 1 includes a plurality of data sources 10, a client terminal 20, and a data virtualization apparatus 30.

In the present embodiment, the plurality of data sources 10 are communicatively connected to the data virtualization apparatus 30. In addition, the client terminal 20 is communicatively connected to the data virtualization apparatus 30.

Each of the plurality of data sources 10 corresponds to a database management system (database management server) that manages various tables holding the data (real data) collected in, for example, Internet of Things (IoT) technology. The data source 10 may refer to the real data (data file) itself.

The client terminal 20 is a terminal device used by a user and is realized by an electronic device such as a personal computer. The user can specify various queries (inquiries) by operating the client terminal 20. The query specified by the user at the client terminal 20 is, for example, an instruction sentence (SQL sentence) described in Structured Query Language (SQL) or the like. For example, when a query (hereinafter referred to as a data acquisition query) for acquiring (searching) the data held in a table managed in a specific data source 10 is specified at the client terminal 20, the client terminal 20 presents (displays) the data acquired by the data virtualization apparatus 30 based on the data acquisition query to the user.

The data virtualization apparatus 30 is an information processing apparatus for realizing data virtualization, which creates a foreign table (virtualized table) corresponding to the table (hereinafter referred to as a source table) managed in each of the plurality of data sources 10 and provides the user with the data via the foreign table. In the present embodiment, the foreign table manages the source table managed in the data source 10 in a data virtualization layer, and realizes a function of urging the client terminal 20 to access the source table as its own table (i.e., to behave as if the source table were its own table).

In the data virtualization apparatus 30, the real data held in the source table managed in each of the plurality of data sources 10 does not need to be duplicated from the data source 10 and held. When a data acquisition query is specified at the client terminal 20 as described above, the data virtualization apparatus 30 operates to specify the data source 10 that manages (the source table holding) the data to be acquired based on the data acquisition query by referring to the foreign table, and to return the data acquired from the data source 10 to the client terminal 20 (i.e., to provide the user with the data).

In addition, the data virtualization apparatus 30 is connected to each of the plurality of data sources 10, and the data acquisition query specified at the client terminal 20 is modified for the data source 10 by, for example, a predetermined plug-in operating on the data virtualization apparatus 30. As a result, even when the data virtualization apparatus 30 is connected to a plurality of data sources 10 having different specifications, the data virtualization apparatus 30 can absorb differences among the data sources 10 and acquire appropriate data based on the data acquisition query specified by the user from each of the data sources 10.

FIG. 2 shows an example of a hardware configuration of the data virtualization apparatus 30 shown in FIG. 1. As shown in FIG. 2, the data virtualization apparatus 30 includes a CPU 31, a nonvolatile memory 32, a main memory 33, a communication device 34, and the like.

The CPU 31 is a processor that controls the operations of each component within the data virtualization apparatus 30. The CPU 31 executes various programs that are loaded into the main memory 33 from the non-volatile memory 32, which is a storage device. These programs include an operating system (OS), programs and the like for the data virtualization apparatus 30 to operate in the data virtualization system 1.

The communication device 34 is a device configured to perform wired or wireless communication with the plurality of data sources 10, the client terminal 20 and the like.

Only the CPU 31, the nonvolatile memory 32, the main memory 33, and the communication device 34 are shown in FIG. 2, but the data virtualization apparatus 30 may further include, for example, other storage devices such as a hard disk drive (HDD) and a solid state drive (SSD) or may further include other devices.

The data virtualization apparatus according to a comparative example of the present embodiment will be described below before describing the data virtualization apparatus of the present embodiment.

FIG. 3 is a block diagram showing an example of a functional configuration of the data virtualization apparatus according to a comparative example of the present embodiment. As shown in FIG. 3, the data virtualization apparatus 30' includes a storage module 301', an interface module 302', a query analysis module 303', a query plan creation module 304', a query execution module 305', a query dividing module 306', a schema information acquisition module 307', and a foreign table information registration module 308'.

It is assumed that the data virtualization apparatus 30' according to the comparative example of the present embodiment is communicatively connected to a plurality of data sources 10 and the client terminal 20, similarly to the data virtualization apparatus 30 of the present embodiment described above with reference to FIG. 1.

The storage module 301' is referred to as, for example, a system catalog or the like and, in the storage module 301', information on the foreign table corresponding to a source table managed in each of the plurality of data sources 10 (hereinafter referred to as foreign table information) is stored. In addition, information on each of the plurality of data sources 10 (hereinafter referred to as data source information) is further stored in the storage module 301'.

The data source information includes, for example, a table name of the source table managed in the data source 10, access information used to access the data source 10, and the like. The access information includes a data source name (server name) of the data source 10, an address assigned to the data source 10, and the like.

When the data acquisition query is specified at the client terminal 20 as described above, the interface module 302' acquires (inputs) the data acquisition query from the client terminal 20.

The query analysis module 303' analyzes the data acquisition query obtained by the interface module 302' and confirms the validity of the data acquisition query. When the validity of the data acquisition query is confirmed, the query analysis module 303' determines a process for the data acquisition query.

The query plan creation module 304' creates an execution plan of the query for efficiently executing the data acquisition query, based on the discrimination result of the process for the data acquisition query by the query analysis module 303'.

The above-described process of the query analysis module 303' and the query plan creation module 304' is executed by referring to the foreign table information stored in the storage module 301'.

The query execution module 305' executes the data acquisition query according to the execution plan created by the query plan creation module 304'.

Since the data virtualization apparatus 30' is connected to, for example, a plurality of data sources 10 with different specifications, the query dividing module 306' divides the data acquisition query executed by the query execution module 305' into a plurality of queries suitable for each of the plurality of data sources 10 (data sources 10 for which the query is to be executed). The plurality of queries divided by the query dividing module 306' are transmitted to the plurality of data sources 10, respectively, using, for example, the data source information stored in the storage module 301'.

In each of the plurality of data sources 10, a source table that holds real data is managed (stored). Each of the data sources 10 that receives the query transmitted by the query dividing module 306' as described above acquires the data from the source table managed in the data source 10 by executing the query, and transmits the data to the data virtualization apparatus 30. The data thus transmitted from each of the data sources 10 to the data virtualization apparatus 30 is transmitted to the client terminal 20 via the interface module 302' as a response to the data acquisition query.

Thus, the data virtualization apparatus 30' according to the comparative example of the present embodiment can realize data virtualization by behaving as if the source table managed in each of the plurality of data sources 10 were its own table, and can provide the user with the data desired by the user (i.e., data acquired based on the data acquisition query).

It has been described the foreign table information is stored in the storage module 301', but it is necessary to create the foreign table (i.e., to register the foreign table information) in advance in the data virtualization apparatus 30' to realize the above-described data virtualization.

When creating the foreign table, for example, a query (hereinafter referred to as a foreign table creation query) for creating the foreign table (i.e., newly registering the foreign table information) is specified at the client terminal 20. The foreign table creation query includes, for example, a data source name (i.e., server name) of the data source 10, a table name of the source table managed in the data source 10, a column name of a column configuring the source table, and the like.

The foreign table creation query thus specified is obtained by the interface module 302' and executed by the query execution module 305'.

When the foreign table creation query is executed by the query execution module 305', the schema information acquisition module 307' obtains (receives) from the data source 10 the schema information in which the structure of the source table managed in the data source 10 specified based on the data source name, table name, and column name included in the foreign table creation query is defined. The schema information acquired by the schema information acquisition module 307' includes the table name of the source table and a column name of a column configuring the source table (hereinafter simply referred to as a column name of the source table). The schema information may further include the type of data (i.e., attribute of the column) held in the source table, and the like.

The foreign table information registration module 308' registers, based on the schema information acquired by the schema information acquisition module 307', the foreign table information on the foreign table corresponding to the source table whose structure is defined by the schema information, in the storage module 301'. The foreign table information stored in the storage module 301' in the data virtualization apparatus 30' according to the comparative example of the present embodiment includes the table name of the foreign table (source table), the column name of the column configuring the foreign table, and the like. In addition, the table name of the foreign table may be the same as the table name of the source table or may be a table name obtained by processing the table name of the source table in a predetermined manner. In this case, the table name of the foreign table may be a table name of the source table assigned identification information (for example, number or the like) indicating the foreign name.

FIG. 4 shows an outline of operations of the data virtualization apparatus 30' upon creating the foreign table. In the example shown in FIG. 4, a table composed of a column in which a table name is "media_types" and column names are "Media Type Id" and "Name" is managed in the data source 10.

It is assumed that as shown in FIG. 4, for example, the foreign table creation query "CREATE FOREIGN TABLE media_types ("Media Type Id" bigint, "Name" text) SERVER sqlite_server;" is specified at the client terminal 20. This foreign table creation query means a foreign table corresponding to the source table which is managed by the data source 10 whose data source name (server name) is "sqlite_server" and which is composed of the column whose table name is "media_types" and whose column names are "Media Type Id" and "Name". In this example, "bigint" included in the foreign table creation query is the type (attribute) of the column whose column name is "Media Type Id", and "text" is the type (attribute) of the column whose column name is "Name".

In this case, the foreign table creation query is executed by the query execution module 305', and the schema information acquisition module 307' acquires the schema information from the data source 10 whose data source name is "sqlite_server". In this case, the schema information acquired by the schema information acquisition module 307' includes the table name "media_types" and the column names "Media Types Id" and "Name". It is assumed that this schema information is stored in a system catalog in the data source 10.

When the schema information is thus acquired by the schema information acquisition module 307', the foreign table information registration module 308' creates a foreign table including the column whose table name is "media_types" and whose column names are "Media Types Id" and "Name", based on the schema information. In this case, the foreign table information registration module 308' registers the foreign table information including the table name "media_types" and the column names "Media Types Id" and "Name" in the storage module (system catalog) 301'.

It has been described that the foreign table corresponding to one source table managed in the data source 10 is created (i.e., the foreign table information on the foreign table is registered) and, for example, when a foreign schema import function expressed as "postgres=# IMPORT FOREIGN SCHEMA public FROM SERVER sqlite_server INTO public;" is executed, the schema information that structures of all the source tables managed in the data source 10 whose data source name is "sqlite_server" are defined, is acquired, and the foreign tables corresponding to the respective source tables can be created.

FIG. 5 shows an outline of operations of the data virtualization apparatus 30' upon acquiring the data via the above foreign table illustrated in FIG. 4.

In the example shown in FIG. 5, it is assumed that, for example, "SELECT*FROM media_types;" is specified at the client terminal 20 as the data acquisition query. This data acquisition query means acquiring the data held in a table whose table name is "media_types".

In this case, the data virtualization apparatus 30' accesses the data source 10 that manages the source table whose table name is "media_types", based on the foreign table information and the data source information, and acquires the data held in the source table. The data thus acquired is returned from the data virtualization apparatus 30' to the client terminal 20.

It has been described that the data is acquired from one data source 10, based on the data acquisition query but, when a plurality of data sources 10 managing the source table whose table name is "media_types" as described above exist, data can be acquired from each of the plurality of data sources 10.

In addition, the data acquisition query shown in FIG. 5 includes the only table name of the table for which data is to be acquired and, when data (values) of a specific column is to be acquired, the column name of the column is included in the data acquisition query.

As described above, in the data virtualization apparatus 30', it is possible to acquire (extract) the definition of the structure of the source table managed in the data source 10, automatically create (register) the foreign table, and acquire the data from the data source 10 via the foreign table.

The foreign table created in the data virtualization apparatus 30' is capable of adding, changing, deleting and referring to records similarly to a normal table.

Since the foreign table created in the data virtualization apparatus 30' according to the comparative example of the present embodiment is created (registered) with the table name and the column name of the source table, the foreign table may be assigned different names (i.e., table name and column names) having the same meaning when spelling inconsistency occurs among the plurality of data sources 10. In such a case, even if the same type of data is to be acquired from the source table managed in each of the plurality of data sources 10, the source table cannot be accessed via a foreign table having a table name different from the table name included in the data acquisition query, and the data cannot be acquired from the source table.

More specifically, it is assumed that a source table whose table name is "purchase" (hereinafter simply referred to as "purchase table") is managed in a first data source 10 of the plurality of data sources 10, that a source table whose table name is "buying" (hereinafter simply referred to as "buying table") is managed in a second data source 10, and that the same type of data (for example, data related to purchasing) is held in the purchase table and the buying table.

In this case, it is preferable to acquire the data from the purchase table and the buying table, based on one data acquisition query specified at the client terminal 20, but the purchase table and the buying table have different table names. In such a case, for example, in the data acquisition query including the table name of the purchase table, the data can be acquired from the purchase table, but the data cannot be acquired from the buying table. In contrast, in the data acquisition query including the table name of the buying table, the data can be acquired from the buying table, but the data cannot be acquired from the purchase table.

That is, in the data virtualization apparatus 30' according to the comparative example of the present embodiment, the table name and the like must be accurately specified when acquiring (referring to) the data, and the plurality of data sources 10 (source tables) having different table names cannot be accessed efficiently.

Thus, the present embodiment has a configuration that realizes efficient access to the source tables managed in the plurality of data sources 10.

Figure 6:
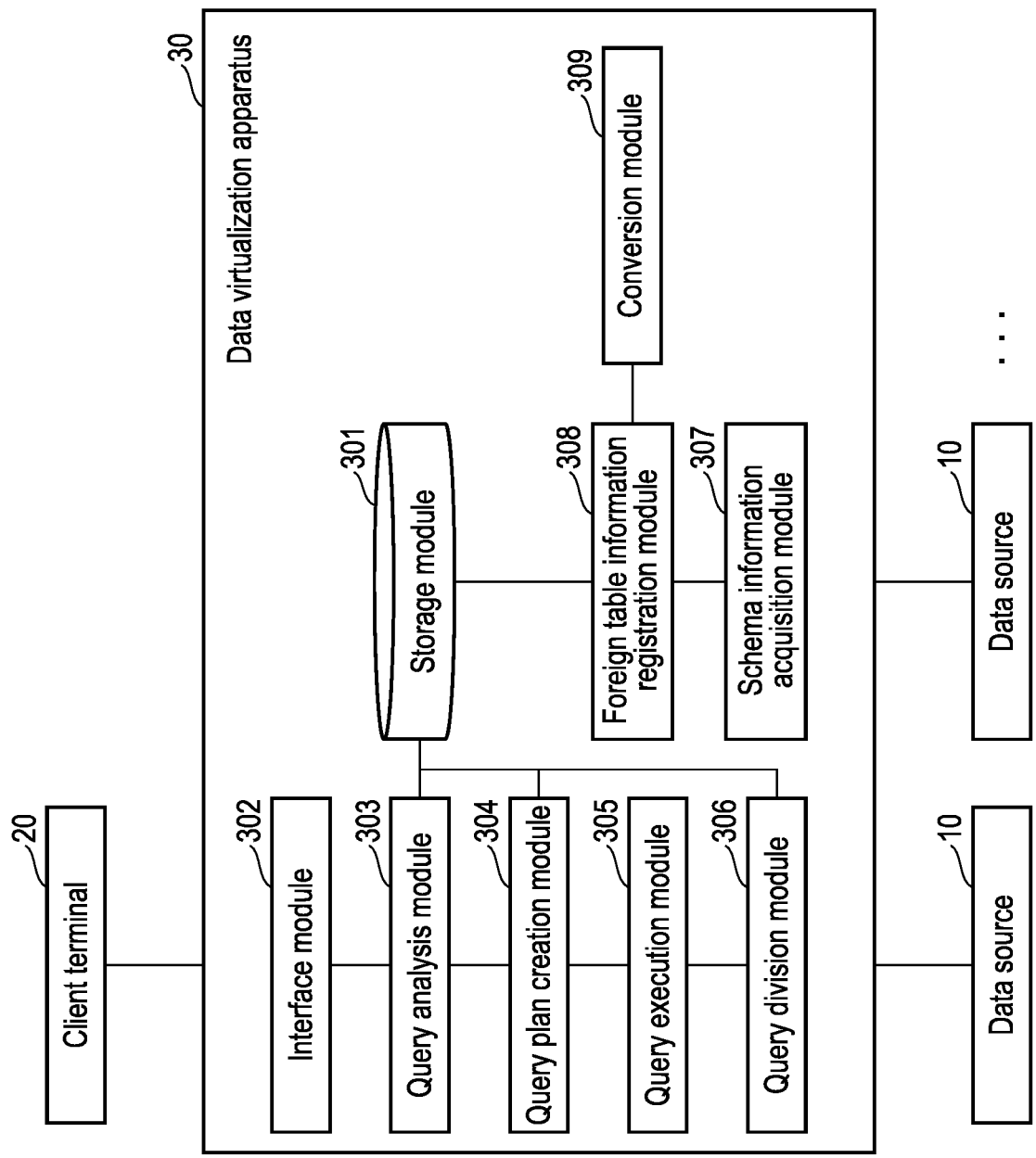
FIG. 6 is a block diagram showing an example of a functional configuration of the data virtualization apparatus according to the embodiment.

FIG. 6 is a block diagram showing an example of a functional configuration of the data virtualization apparatus 30 according to the present embodiment. As shown in FIG. 3, the data virtualization apparatus 30 includes a storage module 301, an interface module 302, a query analysis module 303, a query plan creation module 304, a query execution module 305, a query division module 306, a schema information acquisition module 307, a foreign table information registration module 308, and a conversion module 309.

In the present embodiment, the storage module 301 is realized by a non-volatile memory 32, other storage device or the like provided in the data virtualization apparatus 30.

In addition, in the embodiment, it is assumed that some or all of the interface module 302, the query analysis module 303, the query plan creation module 304, the query execution module 305, the query dividing module 306, the schema information acquisition module 307, the foreign table information registration module 308, and the conversion module 309 are realized by causing the CPU 31 provided in the data virtualization apparatus 30 (i.e., the computer of the data virtualization apparatus 30) to execute a predetermined program, i.e., software. The predetermined program is a program for the data virtualization apparatus 30 to operate in the data virtualization system 1, and may be stored in advance in a computer-readable storage medium and distributed or may be downloaded to the data virtualization apparatus 30 via a network.

It has been described that some or all of the above modules 302 to 309 are realized by software, but, for example, some or all of the modules 302 to 309 may be realized by hardware or may be realized as a combined configuration of software and hardware.

In addition, the storage module 301, the interface module 302, the query analysis module 303, the query plan creation module 304, the query execution module 305, the query dividing module 306, the schema information acquisition module 307, and the foreign table information registration module 308 shown in FIG. 6 are functional parts corresponding to the storage module 301', the interface module 302', the query analysis module 303', the query plan creation module 304', the query execution module 305', the query division module 306', the schema information acquisition module 307', and the foreign table information registration module 308' shown in FIG. 3. For this reason, in FIG. 6, the detailed description of the same portions as those of FIG. 3 is omitted, and portions different from FIG. 3 (i.e., the data virtualization apparatus 30' according to the comparative example of the present embodiment) will be mainly described.

In the above-described data virtualization apparatus 30' according to the comparative example of the present embodiment, it has been described that the foreign table information registration module 308' registers the foreign table information, based on the schema information (table name and column name of the source table) acquired by the schema information acquisition module 307', but the conversion module 309 converts the table name and the column names included in the schema information, in the data virtualization apparatus 30 according to the present embodiment. In this case, the foreign table information registration module 308 registers the foreign table information in the storage module 301, based on the table name and the column names converted by the conversion module 309.

The operations of the data virtualization apparatus 30 of the present embodiment will be described below. First, an outline of the operations of the data virtualization apparatus 30 upon creating the foreign table (registering foreign table information) will be described with reference to FIG. 7.

It is assumed that the schema information acquisition module 307 acquires the schema information including the table name "buying" and the column names "amount" and "rate" from the data source 10 that manages the source table composed of the column whose table name is "buying" and whose column names are "amount" and "rate".

In this case, the conversion module 309 converts the table name and the column names included in the schema information acquired by the schema information acquisition module 307, and the conversion of the table names and column names can be performed by referring to, for example, a thesaurus. For example, a plurality of representative words and synonyms of the plurality of representative words are registered in association with each other in the thesaurus, and the conversion module 309 can convert the table name and the column names included in the schema information into synonyms (representative words) by referring to the thesaurus.

Figure 7:
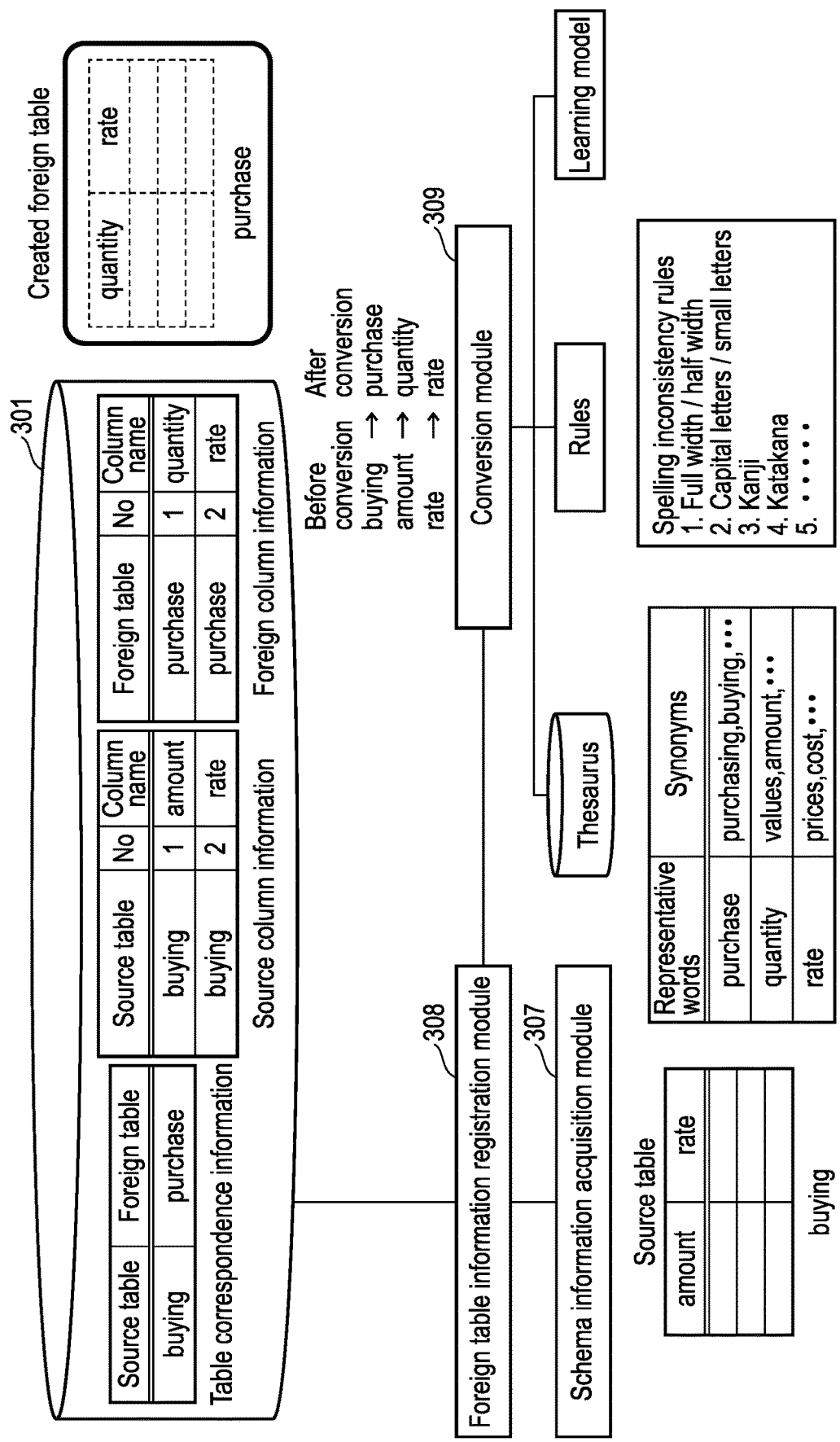
FIG. 7 is a diagram illustrating an outline of operations of the data virtualization apparatus upon creating a foreign table.

In the example shown in FIG. 7, synonyms "purchasing" and "buying" are registered in association with a representative word "purchase", in the thesaurus. In this case, the conversion module 309 can convert the table name "purchasing" included in the schema information to "purchase", which is a representative word of the "purchasing".

In addition, synonyms "values" and "amount" are registered in association with a representative word "quantity", in the thesaurus. In this case, the conversion module 309 can convert the column name "amount" included in the schema information to "quantity", which is a representative word of "amount".

Synonyms "prices" and "cost" are registered in association with a representative word "rate" in the thesaurus but, since a column name "rate" included in the schema information is a representative word, the column name "rate" does not need to be converted.

When the above-mentioned thesaurus is used, it is possible to realize a conversion which aggregates the table name and the column names included in the schema information to a specific synonym (representative word).

In the present embodiment, since the table name and the column names of the source table are converted into synonyms as described above, it can be said that the creation of the foreign table in the present embodiment is performed based on semantics.

It has been described that the table name and the column names are converted by using the thesaurus, but the table name and the column names included in the schema information may be converted by using a rule (spelling inconsistency rule) for correcting the spelling inconsistency in the table name and the column names, which is prepared separately from the thesaurus. The rules used to convert the table name and the column names include, for example, the rules to unify the notation into full-width or half-width characters, to unify the notation into capital letters or small letters, to unify the notation of Kanji characters, and to unify the notation of Katakana letters, and may include a rule to unify the notation from the other viewpoints. The conversion module 309 may convert the table name and the column names included in the schema information to be normalized using such rules.

Furthermore, the table name and the column names included in the schema information may be converted by using a learning model to be caused to learn to input the table name and the column names and output synonyms of the table name and the column names. In this case, the conversion module 309 can convert the table name and the column names included in the schema information by inputting the table name and the column names to the learning model. This learning model may a model that, for example, implements clustering of the table name and the column names (words), or a model that is generated by applying various known machine learning algorithms such as neural networks or random forests.

It is assumed that the above-described thesaurus, the rule, and the learning model used for the conversion of the table name and the column names are prepared in advance and maintained in the data virtualization apparatus 30.

The foreign table information registration module 308 registers the foreign table information to the storage module 301, based on the table name "purchase" converted from the table name "buying" included in the schema information as described above, the column name "quantity" converted from the column name "amount", and the column name "rate" included in the schema information.

The foreign table information registered in the storage module 301 in the present embodiment includes table correspondence information, source column information, and foreign column information.

The table correspondence information is information that indicates the correspondence between a source table and a foreign table corresponding to the source table. In the example shown in FIG. 7, the table correspondence information including the table name "buying" of the source table and the table name "purchase" of the foreign table in association with each other is registered.

The source column information is information about the columns that constitute the source table. In the example shown in FIG. 7, the source column information including the table name "buying" of the source table and the column names "amount" and "rate" in association with each other is registered.

The foreign column information is information on the columns configuring the foreign table. In the example shown in FIG. 7, the foreign column information including the table name "purchase" of the foreign table and the column names "quantity" and "rate" in association with each other is registered.

Registering the foreign table information including the above-described table correspondence information, source column information, and foreign column information in the storage module 301 corresponds to creating, in the data virtualization apparatus 30, a foreign table composed of columns whose table name is "purchase" and whose column names are "quantity" and "rate", which is shown in FIG. 7.

Next, an example of the procedure of the data virtualization apparatus 30 upon creating the foreign table will be described with reference to FIG. 8.

First, when a foreign table creation query is specified at the client terminal 20, the interface module 302 acquires the foreign table creation query (step S1).

When the process of step S1 is executed, the foreign table creation query obtained in step S1 is executed by the query execution module 305, and the schema information acquisition module 307 acquires schema information indicating a definition of a source table managed in at least one data source 10 from the data source 10 (step S2). As described above, the schema information includes the table name and the column names of the source table. Is assumed that a plurality of elements of schema information (i.e., schema information in which the structure of each of the plurality of source tables is defined) is acquired in step S2.

Processes of steps S2 to S10 are executed for each of the plurality of schema information acquired in step S2. In the following descriptions, the schema information that is a target of the processes of steps S2 to S10 is referred to as target schema information.

First, the foreign table information registration module 308 extracts the table name included in the target schema information from the target schema information (step S3).

Next, the conversion module 309 performs a conversion process to convert the table name extracted in step S3 (step S4).

When the process of step S4 is executed, the foreign table information registration module 308 creates the table correspondence information including the table name of the source table included in the target schema information and the table name converted from the table name extracted from the target schema information in step S4 (i.e., the table name of the foreign table) in association with each other, and registers the table correspondence information in the storage module 301 (step S5).

The source table is composed of a plurality of columns, and the target schema information includes a plurality of column names. In this case, the processes of steps S6 to S9 are performed for each of the plurality of column names included in the target schema information. The column name subjected to the processes of steps S6 to S9 is referred to as a target column name in the following descriptions.

First, the foreign table information registration module 308 extracts the target column name from a plurality of column names included in the target schema information (step S6).

Next, the foreign table information registration module 308 creates source column information including the above-described table name of the source table and the target column name extracted in step S6 in association with each other, and registers the source column information in the storage module 301 (step S7).

When the process of step S7 is executed, the conversion module 309 executes a conversion process to convert the target column name extracted in step S6 (step S8).

Next, the foreign table information registration module 308 creates foreign column information including the above-described table name of the foreign table and the column name converted from the target column name in step S8 (i.e., the column name of the foreign table) in association with each other, and registers the foreign column information in the storage module 301 (step S9).

When the process of step S9 is executed, it is determined whether the processes of steps S6 to S9 are performed for all the column names included in the target schema information or not (step S10).

When it is determined that the processes are not executed for all the column names (NO in step S10), the flow returns to step S6 and the processes are repeated. In this case, the column names for which the processes are not executed are referred to as the target column names, and the processes in steps S6 to S9 are executed.

In contrast, when it is determined that the process has been performed for all the column names (YES in step S10), it is determined whether the processes of steps S3 to S10 have been performed for all the schema information acquired in step S2 or not.

If it is determined that the processes have not been executed for all the schema information (NO in step S11), the flow returns to step S3 and the processes are repeated. In this case, the schema information for which the processes have not been executed is used as the target schema information, and the processes of steps S3 to S10 are executed.

In contrast, when it is determined that the processes have been executed for all the schema information (YES in step S11), the processes shown in FIG. 8 are ended.

According to the processes shown in FIG. 8, the table name and the column names included in the schema information acquired from the data source 10 can be converted to register the foreign table information (create the foreign table).

Next, an example of the procedure of the above-described conversion processes (i.e., the processes of steps S4 and S8 shown in FIG. 8) will be described with reference to a flowchart of FIG. 9.

It is assumed that the table name or column names are converted using one of the above-mentioned thesaurus, the rule (spelling inconsistency rules), and the learning model, and that which of the thesaurus, the rule, and the learning model is to be used is set in advance in the setting file, and the like.

In this case, the conversion module 309 refers to the above-described setting file to determine whether to use a thesaurus (step S21).

When it is determined that the thesaurus is to be used (YES in step S21), the conversion module 309 converts the table name or the column names using the thesaurus (step S22). Conversion of the table name or the column names using the thesaurus has been described above, and its detailed description is omitted here.

In contrast, when it is determined that the thesaurus is not to be used (NO in step S21), the conversion module 309 refers to the setting file and determines whether to use the rule (step S23).

When it is determined that the rule is to be used (YES in step S23), the conversion module 309 converts the table name or the column names using the rule (step S24). Conversion of the table name or the column names using the rule has been described above, and its detailed description is omitted here.

In contrast, when it is determined that the rule is not to be used (NO in step S23), the conversion module 309 refers to the setting file and determines whether to use the learning model (step S25).

When it is determined that the learning model is to be used (YES in step S25), the conversion module 309 converts the table name or the column names using the learning model (step S26). Conversion of the table name or the column names using the learning model has been described above, and its detailed description is omitted here.

When it is determined that the learning model is not to be used (NO in step S25), the conversion process is ended. For example, when neither a thesaurus, a rule, nor a learning model is set in the setting file (i.e., it is set that the conversion of the table name or the column names is not executed), it is determined that the learning model is not to be used, in step S25, and the table name or the column names are not converted.

In the example shown in FIG. 9, it has been described that one of the thesaurus, the rule, and the learning model is used to convert the table name or the column names, but the table name or the column names may be converted by combining at least two or more of the thesaurus, the rule, and the learning model. In addition, different conversion methods may be applied to the conversion of the table name and the column names. More specifically, the table name may be converted using the thesaurus, and the column names may be converted using the rule.

Figure 10:
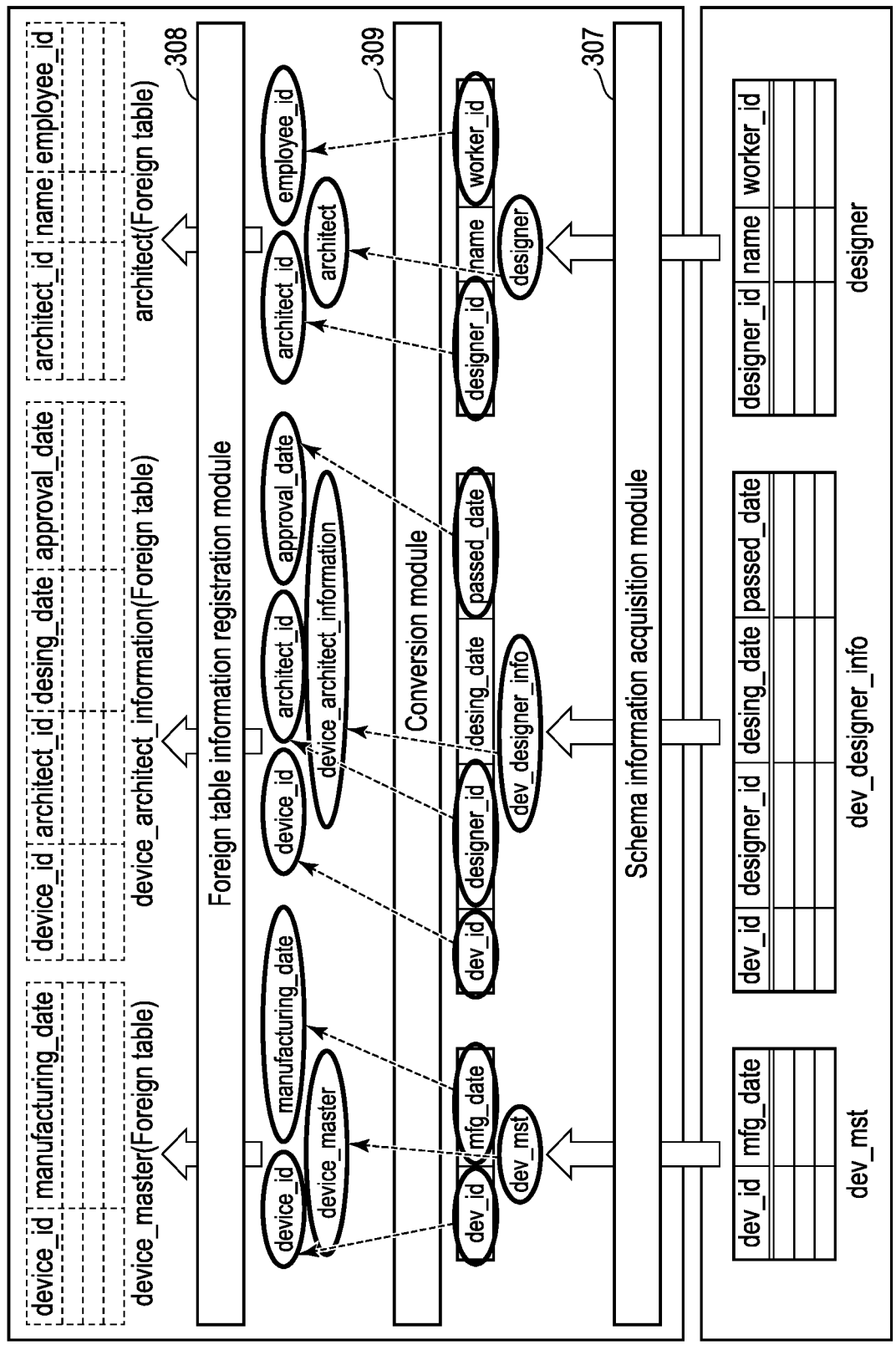
FIG. 10 is a diagram showing a specific example of a foreign table created in the data virtualization apparatus.

FIG. 10 is a diagram showing a specific example of the foreign table created in the data virtualization apparatus 30.

In the example shown in FIG. 10, which will not be described in detail, when the schema information in which the structure of the source table composed of columns whose table name is "dev_mst" and whose column names are "dev_id" and "mfg_date" is defined is acquired, the foreign table composed of columns whose table name is "device_master" and whose column names are "device_id" and "manufacturing_date" is created.

In addition, when the schema information in which the structure of the source table composed of a column whose table name is "dev_designer_info" and whose column names are "dev_id", "designer_id", "design_date" and "approved_date" is defined is acquired, the foreign table composed of a column whose table name is "device_architect_information" and whose column names are "device_id", "architect_id", "design_date", and "approval_date" is created.

Furthermore, when the schema information in which the structure of the source table composed of a column whose table name is "designer" and whose column names are "designer_id", "name" and "worker_id" is acquired, the foreign table composed of a column whose table name is "architect" and whose column The table name is "architect" and the columns are "architect_id", "name" and "employee_id" is created.

As described above, in the present embodiment, first schema information including a first table name of a first source table managed in the first data source 10 and a first column name of a first column constituting the first source table is acquired, the first table name included in the first schema information is converted into a third table name, and the first column name included in the first schema information is converted to the third column name. Thus, the first table correspondence information including the first table name of the first source table and the third table name converted from the first table name (i.e., the table name of the first foreign table) in association with each other, the first source column information including the first table name and the first column name in association with each other, and the first foreign column information including the third table name and the third column name converted from the first column name are registered in the storage module 301.

In the present embodiment, the second schema information including the second table name of the second source table managed in the second data source 10 and the second column name of the second column configuring the second source table is acquired, the second table name included in the second schema information is converted into the third table name, and the second column name included in the second schema information is converted into the third column name. Thus, the second table correspondence information including the second table name of the second source table and the third table name converted from the second table name (i.e., the table name of the second foreign table) in association with each other, the second source column information including the second table name and the second column name in association with each other, and the second foreign column information including the third table name and the third column name converted from the second column name are registered in the storage module 301.

The third table name mentioned above is a synonym for the first table name and the second table name, and the third column name is a synonym for the first column name and the second column name.

In the present embodiment, the foreign table can be created by converting the table name and column names of the source table into synonyms (i.e., the table name and the column names of the data source can be registered with a naming rule based on semantics), in such a configuration. Therefore, when the table names and the column names are different in data sources 10 (source tables) but have the same meanings (i.e., synonyms), they are treated as the same table or column, and data can be acquired from a plurality of data sources 10 in one data acquisition query, thereby expanding the range of the search.

It is assumed that as described above, the first table name and the first column name of the first source table are different from the second table name and the second column name of the second source table, and the table name and the column names of the first foreign table corresponding to the first source table are the first table name and the first column names, the table name and the column names of the second foreign table corresponding to the second source table are the second table name and the second column names (i.e., the foreign table is created without converting the table name and the column names similarly to the comparative example of the present embodiment).

In this case, the first table name and the first column name need to be specified in the data acquisition query to acquire data from the first source table, and the second table name and the second column name need to be specified in the data acquisition query to acquire data from the second source table.

In contrast, in the present embodiment, the table name and column name of the first foreign table corresponding to the first source table is the third table name and the third column name, and the table name and column name of the second foreign table corresponding to the second source table is the third table name and the third column name.

In this case, when the third table name and the third column name are specified in the data acquisition query, data can be acquired from both the first source table and the second source table, and each of the first and second source tables can be efficiently accessed through the first and second foreign tables whose table names and column names are unified and data can be acquired, without specifying a data acquisition query corresponding to each of the first and second source tables whose table names and column names are different.

When the foreign table is created by converting the table name and the column name of the source table, the correspondence between the source table and the foreign table, the information on the columns configuring the source table, and the information on the columns configuring the foreign table are registered in the storage module 301 as the foreign table information (table correspondence information, the source column information and the foreign column information). For this reason, even when the table name and the column name of the foreign table converted from the table name and the column name of the source table are specified in the data acquisition query, an appropriate data source can be accessed and data corresponding to the data acquisition query can be acquired based on the above-described foreign table information and data source information.

In the present embodiment, the table names (first and second table names) of the source tables can be converted into a representative word (third table name) registered in the thesaurus in association with the table names, by referring to the thesaurus in which a plurality of representative words and synonyms of the respective representative words are registered in association with each other. The column names (first and second column names) of the source tables can also be converted in the same manner.

In the present embodiment, with such a configuration, the table names and the column names of the source tables can be appropriately converted into synonyms having the same meaning.

For the conversion of the table names and the column names of the source tables, a rule for correcting the spelling inconsistency in the table names and the column names or a learning model to be caused to learn to input the table names and the column names and output synonyms of the table names and the column names may be used.

An example of an aspect of use of the above-described data virtualization apparatus 30 according to the present embodiment will be described with reference to FIG. 11. FIG. 11 shows an example of applying the data virtualization apparatus 30 according to the present embodiment to Virtual Power Plant/Demand Response (VPP/DR).

VPP is a technology of aggregating distributed energy resources (power generation facilities, storage facilities, and demand facilities) using Information and Communication Technology (ICT) and controlling the energy resources as if they were a single power plant. DR is defined as a change of the power consumption pattern by consumers to suppress the use of electricity in response to the setting of electricity tariffs or payment of incentives, for example, when market prices soar or grid reliability declines.

In this case, data managed in a server device (database management server) owned by each aggregator (such as an organization, a group or the like that bundles power demand and provides effective energy management services) can be virtually integrated by arranging the data virtualization apparatus 30 according to the present embodiment in the VPP/DR shown in FIG. 11.

For example, even when an aggregator (database management server) is added as shown in FIG. 12, the data virtualization apparatus 30 of the present embodiment can easily make a response without changing the application or the like that uses the data virtualization apparatus 30.

Furthermore, the data virtualization apparatus 30 may be configured to be communicatively connected with other data virtualization apparatuses 30 located in higher order of the data virtualization apparatus 30 as shown in FIG. 13 (i.e., the data virtualization apparatus 30 can be configured in a multi-level configuration). FIG. 13 shows an example in which the data virtualization apparatus 30 is located in higher order of VPP/DR and is arranged in a system controller operating in association with VPP/DR based on information obtained from various facilities (such as hydroelectric power plants, thermal power plants and the like) and weather information (weather system).

The example in which the data virtualization apparatus 30 of the present embodiment is applied to VPP/DR has been described, but the data virtualization apparatus 30 may be applied to other fields as long as it is used to virtually integrate data distributed and managed in a plurality of data sources 10 (server devices). More specifically, the data virtualization apparatus 30 can be connected to, for example, a plurality of POS systems and the like that function as the data sources 10 managing the above-described purchasing-related data, and can be used for applications such as virtual integration of such data.

Conversion of both table names and column names included in the schema information in the present embodiment has been described, but the present embodiment may be configured to convert at least either of the table names and the column names.

In addition, it has been described that the data virtualization system 1 includes the client terminal 20 in the present embodiment, but the client terminal 20 may be omitted if the user operates the data virtualization apparatus 30 (i.e., the user operates the data virtualization apparatus 30 to specify various queries).

Second Embodiment

Next, a second embodiment will be described. Since a network configuration of a data virtualization system of the present embodiment is the same as that of the above-described first embodiment, the network configuration will be described as appropriate with reference to FIG. 1. A data virtualization apparatus 30 according to the present embodiment is different from the above-described first embodiment in including a multi-tenant function.

First, the multi-tenant function of the data virtualization apparatus 30 of the present embodiment will be briefly described with reference to FIG. 14.

As described above in the first embodiment, the data virtualization apparatus 30 can provide data to a user via the foreign table by creating a foreign table corresponding to a source table managed in each of the plurality of data sources 10, and the multi-tenant function is a function for integrating a plurality of foreign tables having the same table name and configuration into a single virtual table. According to this multi-tenant function, a foreign table in which a plurality of foreign tables are integrated (hereinafter referred to as a multi-tenant table) is created. In the present embodiment, "the configuration is the same" means that the table configuration based on the number of columns configuring the table and the column names of the columns, etc. is the same.

It is assumed that as shown in FIG. 14, a plurality of data source 10 connected communicably with the data virtualization apparatus 30 include three data sources (first to third data sources) 10 and each of three data sources 10 manages a source table having the same table name and configuration.

In the example shown in FIG. 14, the source table managed by each of the first to third data sources 10 is composed of columns whose table name is "table 1" and whose column names are "value1" and "value2". In addition, as shown in FIG. 14, the source tables managed by the respective first to third data sources 10 are the same in table name and column names (i.e., configuration) but different in data of the columns.

In this case, in the data virtualization apparatus 30, three foreign tables having the same table name and configuration (i.e., foreign tables composed of the columns whose table name is "table 1" and whose column names are "value1" and "value2") are created.

It is assumed that, for example, a data acquisition query "SELECT sum (value2) FROM table 1" is specified at the client terminal 20. This data acquisition query indicates acquiring the sum of the data of the column whose column name is "value2" from the table whose table name is "table1".

In this case, when it is assumed that the above-described multi-tenant table is not created (the multi-tenant function is not provided), sum (value2)=3 is acquired from the source table managed in the first data source 10 based on the above-described data acquisition query. Similarly, sum (value2)=30 is acquired from the source table managed in the second data source 10, and sum (value2)=300 is acquired from the source table managed in the third data source 10. In other words, in this case, separate data is acquired from each data source 10.

In contrast, it is assumed that as shown in FIG. 14, the multi-tenant table which integrates three foreign tables corresponding to the respective source tables managed in the first to third data sources 10 is created (i.e., the multi-tenant function is provided). In this case, when the above-described data acquisition query is specified, sum(value2)=333 is acquired by using the multi-tenant table.

In other words, according to the multi-tenant function, by treating a plurality of foreign tables having the same table name and configuration as one virtual table, data can be searched (acquired) across the plurality foreign tables and more useful data can be thereby provided to users.

Figure 15:
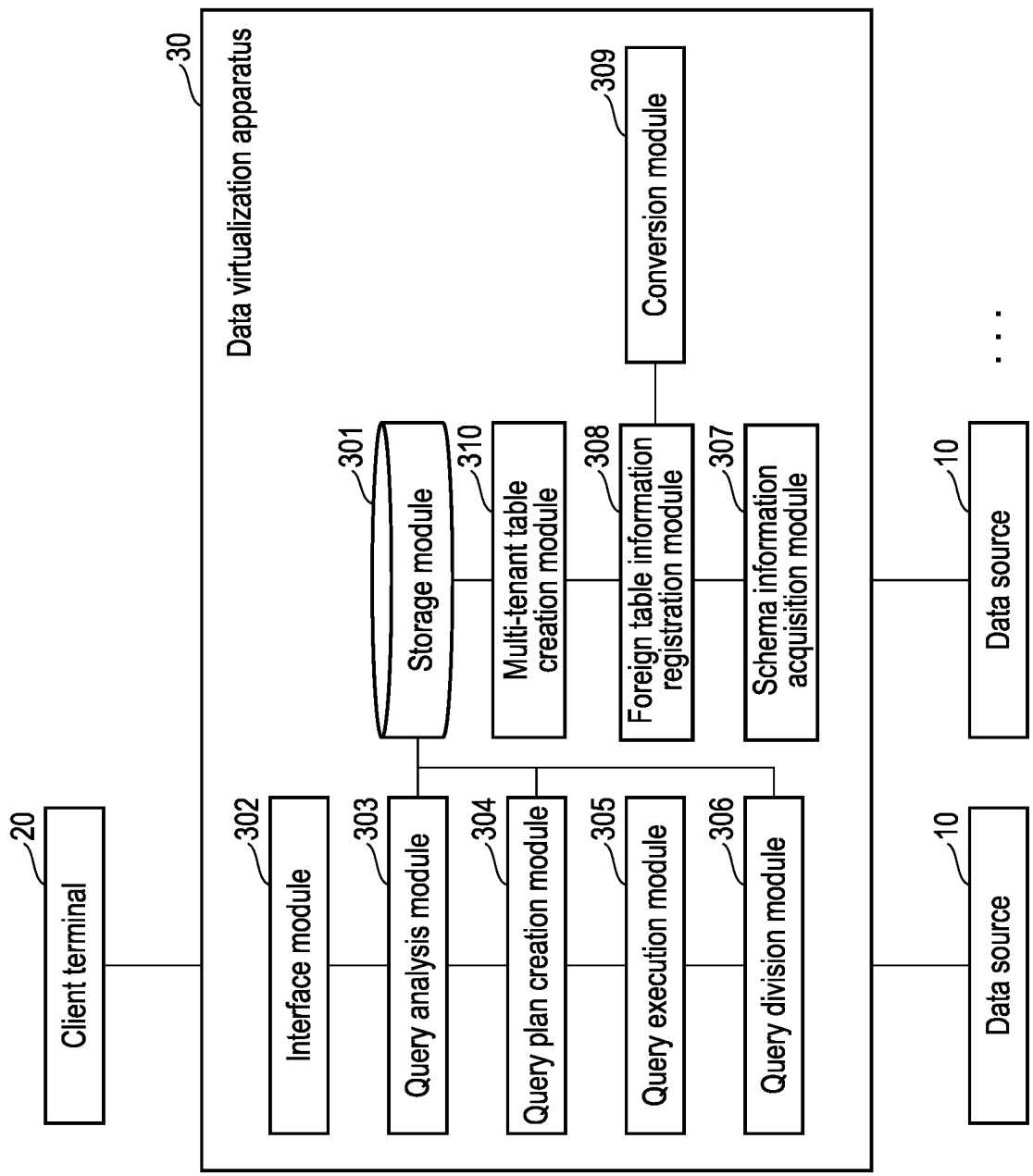
FIG. 15 is a block diagram showing an example of a functional configuration of the data virtualization apparatus according to the embodiment.

FIG. 15 is a block diagram showing an example of a functional configuration of the data virtualization apparatus 30 according to the embodiments. In FIG. 15, the same portions as those in FIG. 6 described above are denoted by the same reference numerals and its detailed description is omitted, and the portions different from those in FIG. 6 are mainly described.

As shown in FIG. 15, the data virtualization apparatus 30 of the present embodiment further includes a multi-tenant table creation module 310.

In the present embodiment, it is assumed that some or all parts of the multi-tenant table creation module 310 are realized by causing the CPU 31 provided in the data virtualization apparatus 30 (i.e., the computer of the data virtualization apparatus 30) to execute a predetermined program, i.e., by software. It has been described that some or all parts of the multi-tenant table creation module 310 are realized by software, but, for example, some or all parts of the multi-tenant table creation module 310 may be realized by hardware or may be realized as a combined configuration of software and hardware.

The multi-tenant table creation module 310 has a function for creating the above-described multi-tenant table. More specifically, the multi-tenant table creation module 310 creates a multi-tenant table that integrates two or more foreign tables having the same table name and configuration, of the plurality of foreign tables created in the data virtualization apparatus 30. The multi-tenant table creation module 310 can further integrate the foreign tables into the already created multi-tenant table. When the multi-tenant table is created by the multi-tenant table creation module 310, information on the multi-tenant table (hereinafter referred to as the multi-tenant table information) is registered in the storage module 301.

The operations of the data virtualization apparatus 30 of the present embodiment will be described below. First, an outline of the operations of the data virtualization apparatus 30 upon creating the multi-tenant table will be described with reference to FIG. 16.

It is assumed that the schema information acquisition module 307 acquires the schema information including the table name "purchase" and the column names "values" and "prices" from the data source 10 managing a source table (hereinafter referred to as a first source table) which has a table name "purchase" and which is composed of columns having column names "values" and "prices".

In addition, it is assumed that the schema information acquisition module 307 acquires the schema information including the table name "buying" and the column names "amount" and "rate" from the data source 10 managing a source table (hereinafter referred to as a second source table) which has a table name "buying" and which is composed of columns having column names "amount" and "rate".

Furthermore, it is assumed that the schema information acquisition module 307 acquires the schema information including the table name "purchasing" and the column names "quantity" and "cost" from the data source 10 that manages a source table (hereinafter referred to as a third source table) having the table name "purchasing", which is composed of a column whose column names are "quantity" and "cost".

In this case, the table name and the column names included in the above-described schema information are converted by the conversion module 309, and a foreign table is created based on the converted table name and column names, which is omitted in FIG. 16.

The conversion of the table name and the column names by the conversion module 309 has been described above in the first embodiment and its detailed description is omitted here and, in the example shown in FIG. 16, a table composed of columns whose table name is "purchase" and whose column names are "quantity" and "rate" is created as a foreign table (hereinafter referred to as a first foreign table) corresponding to the above-described first source table.

In addition, a table which has a table name "purchase" and which is composed of columns having column names "quantity" and "rate" is created as a foreign table (hereinafter referred to as a second foreign table) corresponding to the above-described second source table.

Furthermore, a table which has a table name "purchase" and which is composed of columns having column names "quantity" and "rate" is created as a foreign table (hereinafter referred to as a third foreign table) corresponding to the above-described third source table.

That is, in FIG. 16, first to third foreign table (i.e., three foreign tables) having the same table name and the same configuration are created.

In this case, the multi-tenant table creation module 310 integrates the above-described first to third foreign tables to create the multi-tenant table. This multi-tenant table is a table composed of the column whose table name is "purchase" and whose column names are "quantity" and "rate".

When the multi-tenant table is created by the multi-tenant table creation module 310 as described above, the multi-tenant table information on the multi-tenant table is registered in the storage module 301. The multi-tenant table information may be information that can identify the data source or source table to be accessed when acquiring data via the multi-tenant table, and is set to include, for example, a table name of the multi-tenant table (i.e., the foreign table name of the foreign table integrated when the multi-tenant table is created) and the column names of the column configuring the multi-tenant table, and the like.

Even when the above-described multi-tenant table is created, the foreign table information (table correspondence information, source column information, and foreign column information) for each of the foreign tables integrated when the multi-tenant table is created is set to be registered in the storage module 301.

Next, an example of the procedure of the data virtualization apparatus 30 upon creating the multi-tenant table will be described with reference to a flowchart of FIG. 17.

First, the data virtualization apparatus 30 executes a foreign table creation process (step S31). Since this foreign table creation process corresponds to the process shown in FIG. 8 described in the above-described first embodiment, its detailed description is omitted here.

It is assumed that a plurality of foreign tables are created (a plurality of elements of foreign table information are registered) when the process of step S31 (foreign table creation process) is executed. In this case, processes of following steps S32 to S38 are executed for each of the plurality of foreign tables. The foreign table for which the processes of steps S32 to S38 are executed is referred to as a target foreign table in the following descriptions.

First, the multi-tenant table creation module 310 determines whether or not a multi-tenant table (hereinafter referred to as an existing multi-tenant table) whose table name is the same as that of the target foreign table exists in the multi-tenant tables that have already been created, by referring to the storage module 301 (step S32). In step S32, for example, when the multi-tenant table information in which the table name of the target foreign table is the table name of the multi-tenant table is not stored (registered) in the storage module 301, it is determined that the existing multi-tenant table does not exist. In contrast, when the multi-tenant table information in which the table name of the target foreign table is the table name of the multi-tenant table is stored in the storage module 301, it is determined that the existing multi-tenant table exists.

When it is determined that the multi-tenant table (existing multi-tenant table) having the same table name as that of the target foreign table does not exist (NO in step S32), the multi-tenant table creation module 310 determines whether or not the other foreign table (hereinafter referred to as an existing foreign table) having the same table name as that of the target foreign table exists (step S33). In step S33, when the foreign table information (table correspondence information or foreign column information) including the same table name as that of the target foreign table, other than the foreign table information on the target foreign table, is stored in the storage module 301, it is determined that the existing foreign table exists. In contrast, when the foreign table information (table correspondence information or foreign column information) including the same table name as that of the target foreign table, other than the foreign table information on the target foreign table, is not stored in the storage module 301, it is determined that the existing foreign table does not exist.

When it is determined that the other foreign table (existing foreign table) having the same table name exists (YES in step S33), the multi-tenant table creation module 310 determines whether or not the configuration of the existing foreign table is the same as that of the target foreign table (step S34). In step S24, when all of the column names included in the foreign column information including the table name of the existing foreign table match the column names of the columns configuring the target foreign table, it is determined that the configuration of the existing foreign table is the same as the configuration of the target foreign table. In contrast, when at least one of the column names included in the foreign column information including the table name of the existing foreign table does not match the column names of the columns configuring the target foreign table, it is determined that the configuration of the existing foreign table is not the same as the configuration of the target foreign table.

When it is determined that the configuration of the existing foreign table is the same as that of the target foreign table (YES in step S34), the multi-tenant table creation module 310 creates multi-tenant table information on the multi-tenant table that integrates the target foreign table and the existing foreign table (step S35). The multi-tenant table information is created based on, for example, the table names and column names of the target foreign table and the existing foreign table, and the like.

The multi-tenant table information created in step S35 is registered in the storage module 301 (step S36).

In the present embodiment, the multi-tenant table is created by executing the above-described processes of steps S35 and S36.

In contrast, when it is determined in step S32 that the multi-tenant table (existing multi-tenant table) having the same table name as that of the target foreign table exists (YES in step S32), the multi-tenant table creation module 310 determines whether the configuration of the existing multi-tenant table is the same as that of the target foreign table or not (step S37). If it is assumed that the multi-tenant table information on the existing multi-tenant table is the information including the column names of the column configuring the existing multi-tenant table as described above, and when all of the column names indicated by the multi-tenant table information match the column names of the columns configuring the target foreign table in step S37, it is determined that the configuration of the existing multi-tenant table is the same as that of the target foreign table. In contrast, when at least one of the column names indicated by the multi-tenant table information on the existing multi-tenant table does not match the column names of the column configuring the target foreign table, it is determined that the configuration of the existing multi-tenant table is not the same as that of the target foreign table.

When it is determined that the configuration of the existing multi-tenant table is the same as that of the target foreign table (YES in step S37), the multi-tenant table creation module 310 adds (the table name and the like of) the target foreign table to the multi-tenant table information on the existing multi-tenant table (step S38). By executing the process of step S38, the target foreign table is added as one of the plurality of foreign tables integrated into the existing multi-tenant table. The multi-tenant table information to which the target foreign table is added in step S38 is registered (overwritten) in the storage module 301.

When it is determined in step S37 that the configuration of the existing multi-tenant table is not the same as that of the target foreign table (NO in step S37), the processes following step S33 are executed.

When the process of step S36 or S38 is executed, the multi-tenant table creation module 310 determines whether or not the processes of steps S32 to S38 have been executed for all the foreign tables created by executing the process of step S31 (step S39).

When it is determined that the processes have not been executed for all the foreign tables (NO in step S39), the flow returns to step S32 and the processes are repeated. In this case, the process of step S32 is executed while using the foreign table for which the processes have not been executed as the target foreign table.

In contrast, when it is determined that the processes have been executed for all the foreign tables (YES in step S39), the processes shown in FIG. 17 are ended.

When it is determined in step S33 that no other foreign table (existing foreign table) having the same table name exists (NO in step S33) or when it is determined in step S34 that the configuration of the existing foreign table is not the same as that of the target foreign table (NO in step S34), the process of step S39 is executed.

In addition, it has been described that the processes following step S33 are executed when it is determined in step S37 that the configuration of the existing multi-tenant table is not the same as that of the target foreign table, but, for example, the process of step S39 may be executed.

As described above, in the present embodiment, the multi-tenant table in which the plurality of foreign tables are integrated is created based on the foreign column information (first and second foreign column information) for the columns configuring each of the plurality of foreign tables. According to such a configuration, since the data can be searched (acquired) across the plurality of foreign tables via the multi-tenant table, more useful data can be provided to the user.

Figure 18:
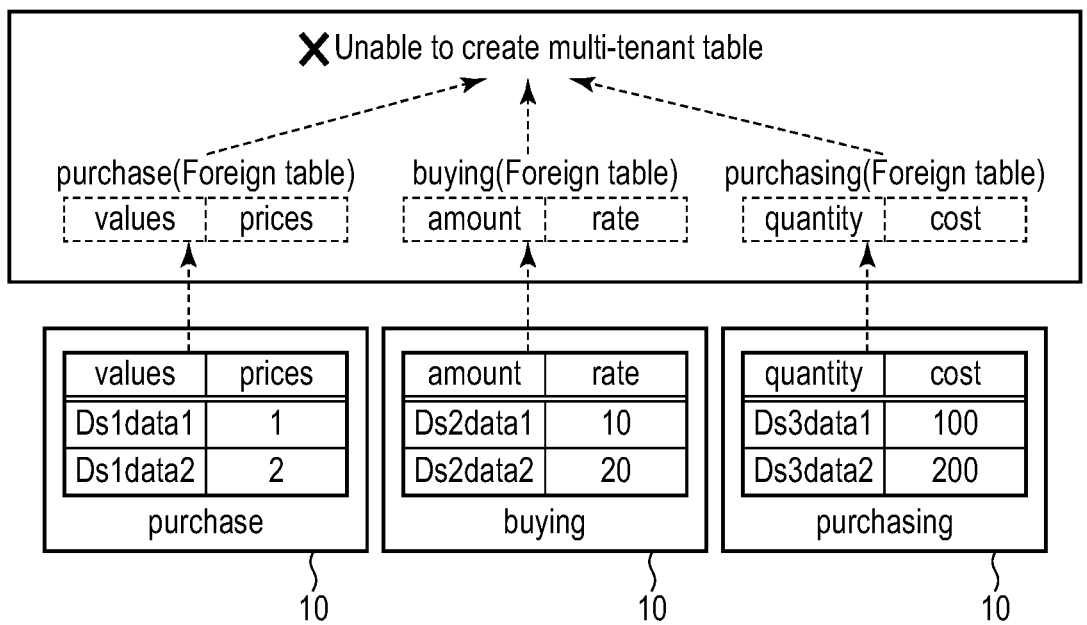
FIG. 18 is a diagram illustrating an advantage of the embodiment.

Advantages of the present embodiment will be described with reference to FIG. 18 and FIG. 19. FIG. 18 is a diagram illustrating creation of the multi-tenant table in the above-described comparative example of the first embodiment.

It is assumed that as shown in FIG. 18, for example, a source table composed of columns whose table name is "purchase" and whose column names are "values" and "prices" is managed in the first data source 10. According to the above-described comparative example of the first embodiment, the table name of the foreign table corresponding to this source table is "purchase", and the column names of the columns configuring the foreign table are "values" and "prices".

In addition, it is assumed that, for example, a source table which has a table name "buying" and which is composed of columns having column names "amount" and "rate" is managed in the second data source 10. According to the above-described comparative example of the first embodiment, the table name of the foreign table corresponding to this source table is "buying", and the column names of the columns configuring the foreign table are "amount" and "rate".

Furthermore, it is assumed that, for example, a source table which has a table name "purchasing" and which is composed of columns having column names "quantity" and "cost" is managed in the third data source 10. According to the above-described comparative example of the first embodiment, the table name of the foreign table corresponding to this source table is "purchasing", and the column names of the columns configuring the foreign table are "quantity" and "cost".

In this case, even if the data virtualization device 30' according to the above-described comparative example of the first embodiment includes the multi-tenant function and attempts to create the multi-tenant table, the table names and configurations of the above-described three foreign tables (i.e., column names of the columns configuring the foreign tables) do not match, and the multi-tenant table cannot be therefore created from the three foreign tables.

Figure 19:
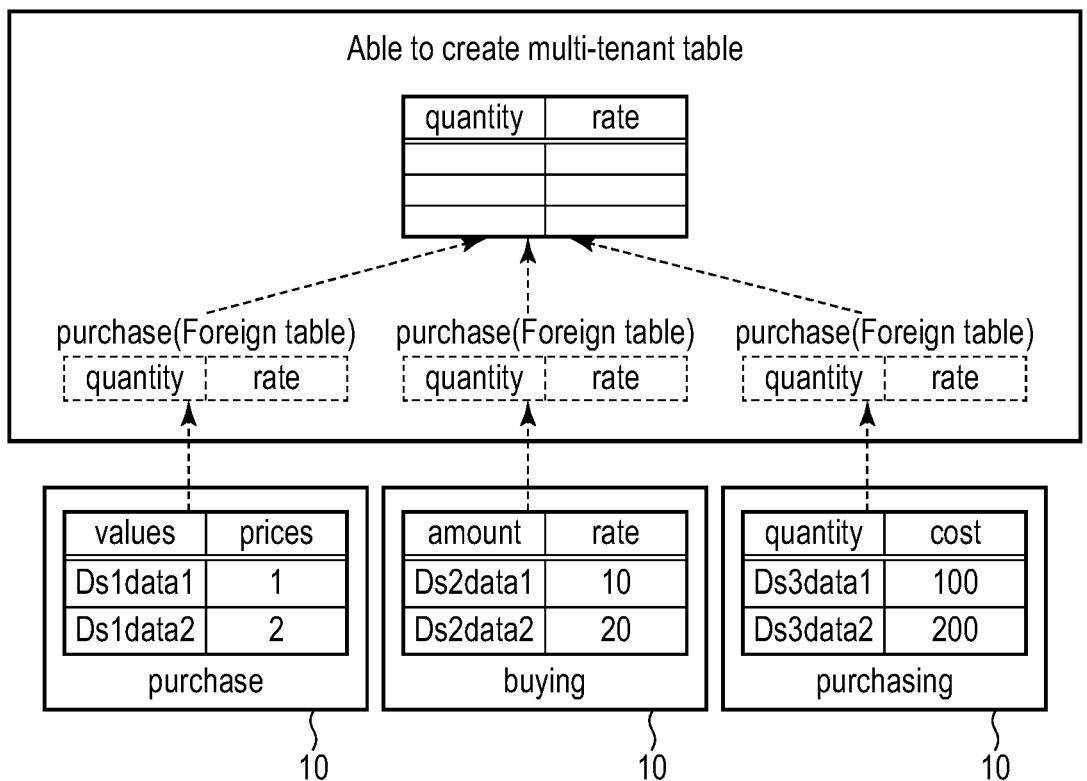
FIG. 19 is a diagram illustrating an advantage of the embodiment.

Next, FIG. 19 is a diagram illustrating creation of the multi-tenant table in the present embodiment.

When it is assumed that, for example, the source table described with reference to FIG. 18 is managed in the first data source 10, the table name of the foreign table corresponding to the source table in the present embodiment is "purchase", and the column names are "quantity" and "rate".

In addition, when it is assumed that, for example, the source table described with reference to FIG. 18 is managed in the second data source 10, the table name of the foreign table corresponding to the source table in the present embodiment is "purchase", and the column names are "quantity" and "rate".

Furthermore, when it is assumed that, for example, the source table described with reference to FIG. 18 is managed in the third data source 10, the table name of the foreign table corresponding to the source table in the present embodiment is "purchase", and the column names are "quantity" and "rate".

In this case, since the table names and configurations of the above-described three foreign tables are the same, the data virtualization device 30 of the present embodiment can create the multi-tenant table from the three foreign tables.

That is, in the above-described comparative example of the first embodiment, when source tables having different table names and configurations are managed in the plurality of data sources 10, respectively, the multi-tenant table cannot be created from the foreign tables corresponding to the source tables but, in the present embodiment, even when source tables having different table names and configurations are managed in the plurality of data sources 10, respectively, the multi-tenant table that integrates the plurality of foreign tables can be created by creating the foreign table in which the table name and column names are converted as described in the first embodiment.

Third Embodiment

Next, a third embodiment will be described. Since a network configuration of a data virtualization system of the present embodiment is the same as that of the above-described first embodiment, the network configuration will be described as appropriate with reference to FIG. 1. A data virtualization apparatus 30 of the present embodiment is different from the above-described first embodiment in converting a table name and column names included in a data acquisition query specified at a client terminal 20.

FIG. 20 is a block diagram showing an example of a functional configuration of the data virtualization apparatus 30 according to the embodiment. In FIG. 20, the same portions as those in FIG. 6 described above are denoted by the same reference numerals and its detailed description is omitted, and the portions different from those in FIG. 6 are mainly described.

As shown in FIG. 20, the data virtualization apparatus 30 of the present embodiment further includes a second conversion module 311. A first conversion module 309 shown in FIG. 20 is a functional module which is the same as the conversion module 309 shown in FIG. 6.

In the present embodiment, it is assumed that some or all parts of the second conversion module 311 are realized by causing the CPU 31 provided in the data virtualization apparatus 30 (i.e., the computer of the data virtualization apparatus 30) to execute a predetermined program, i.e., by software. It has been described that some or all parts of the above-described second conversion module 311 are realized by software but, for example, some or all parts of the second conversion module 311 may be realized by hardware or may be realized as a combined configuration of software and hardware.

A data acquisition query specified at the client terminal 20 by the user includes, for example, a table name of a table which is a target of data acquisition but, when the user specifies a data acquisition query including a table name other than the table name of the foreign table created at the data virtualization device 30, appropriate data cannot be acquired through the foreign table.

Thus, the second conversion module 311 in the present embodiment includes a function of converting a table name included in the data acquisition query specified at the client terminal 20. The data acquisition query may include column names, and the second conversion module 311 also includes a function of converting the column names.

The operations of the data virtualization apparatus 30 of the present embodiment will be described below. First, an outline of operations of the data virtualization apparatus 30 upon converting a table name and column names included in the data acquisition query will be described with reference to FIG. 21.

It is assumed that a data acquisition query "SELECT amount, rate FROM buying" is specified at the client terminal 20. This data acquisition query indicates acquiring data of columns having column names "amount" and "rate" from a table having a table name "buying". That is, this data acquisition query includes (specifies) a table name (TABLE) and a column name (COLUMN). The data acquisition query may also include a condition (WHERE) for acquiring the data.

In this case, the data acquisition query is acquired by an interface module 302 and delivered from the interface module 302 to a query analysis module 303.

The query analysis module 303 analyzes the data acquisition query. In this case, for example, the query analysis module 303 creates a parse tree representing a syntax of the data acquisition query to confirm whether or not the data acquisition query is described in a correct grammar (i.e., the validity of the data acquisition query). In the example shown in FIG. 21, by creating the parse tree of the data acquisition query by the query analysis module 303, the table name "buying" and the column names "amount" and "rate" included in the data acquisition query are acquired.

In this case, the second conversion module 311 converts the table name and column names acquired as described above. In the example shown in FIG. 21, the table name "buying" is converted into "purchase" and the column name "amount" is converted into "quantity". In the example shown in FIG. 21, the column name "rate" is not converted since the conversion is unnecessary.

According to this, the query analysis module 303 can create a data acquisition query "SELECT quantity, rate FROM purchase" and deliver the data acquisition query to a query execution module 305.

Since the conversion process (conversion of the table name and column names included in the data acquisition query) by the second conversion module 311 is the same as the conversion process (conversion of the table name and column names included in the schema information) by the conversion module 309 described above in the first embodiment, its detailed description is omitted here.

Next, an example of a procedure of the data virtualization apparatus 30 upon specifying the data acquisition query at the client terminal 20 will be described with reference to a flowchart of FIG. 22.

When the data acquisition query is specified at the client terminal 20 as described above, the interface module 302 acquires (inputs) the data acquisition query from the client terminal 20 (step S41). The data acquisition query acquired in step S41 includes at least the table name, but may also include a column name in addition to the table name.

Next, the query analysis module 303 analyzes the data acquisition query acquired in step S41 (step S42).

When the process of step S42 is executed, the query analysis module 303 creates a parse tree representing the syntax of the data acquisition query acquired in step S41, and determines (confirms) whether or not the data acquisition query is described in a correct grammar based on the parse tree (step S43).

When it is determined that the data acquisition query is not described in the correct grammar (NO in step S43), for example, an error is returned to the client terminal 20, and the processes of FIG. 22 are ended.

In contrast, when it is determined that the data acquisition query is described in a correct grammar (YES in step S43), the query analysis module 303 acquires (extracts) the table name from the above-described parse tree (step S44).

Next, the query analysis module 303 determines whether or not the foreign table of the table name acquired in step S44 exists in the foreign tables already created in the data virtualization apparatus 30 (step S45). The process of step S45 is executed based on whether or not the foreign table information (table correspondence information or foreign column information) including the table name acquired in step S44 as the table name of the foreign table exists in the storage module 301.

When it is determined that no foreign table exists (NO in step S45), the second conversion module 311 executes a conversion process of converting the table name acquired in step S44 (step S46). Since the process in step S46 corresponds to the above-described process in step S4 shown in FIG. 8, its detailed description is omitted here.

It has been described that, for example, the table name is converted by using a thesaurus, a rule or a learning model in the above-described step S4 shown in FIG. 8 and, for example, in the configuration in which the table name is converted by using a thesaurus in step S4, the conversion process using a thesaurus is also executed similarly in step S46. The conversion is also executed similarly in a case where a rule or a learning model is used in step S4. That is, the conversion process of the table name and column name included in the data acquisition query in the present embodiment is executed in the same manner as the conversion process executed when the foreign table is created.

When the process of step S46 is executed, the query analysis module 303 determines whether or not a foreign table of the table name converted in step S46 (i.e., the table name acquired after the conversion) exists in the foreign tables already created in the data virtualization device 30

(step S47). The process of step S47 is executed based on whether or not the foreign table information (table correspondence information or foreign column information) including the table name acquired after the conversion in step S46 as the table name of the foreign table exists in the storage module 301.

When it is determined that the foreign table exists (YES in step S47), the query analysis module 303 replaces the table name included in the data acquisition query acquired in step S41 with the table name acquired after the conversion in step S46 (step S48).

In contrast, when it is determined that the foreign table does not exist (NO in step S47), the process of step S48 is not executed (i.e., the data name included in the data acquisition query is not converted).

Next, the query analysis module 303 acquires (extracts) the column names from the above-described parse tree (step S49).

When the process of step S49 is executed, the query analysis module 303 determines whether or not a column having the column name acquired in step S49 exists in the columns configuring the foreign table already created in the data virtualization device 30 (step S50). The process of step S50 is executed based on whether or not the foreign table information (foreign column information) including the column name acquired in step S49 as the column name of the column configuring the foreign table exists in the storage module 301.

When it is determined that the column does not exist (NO in step S50), the second conversion module 311 executes the conversion process of converting the column name acquired in step S49 (step S51). Since the process in step S51 corresponds to the process in step S8 shown in FIG. 8 described above, its detailed description is omitted here.

It has been described that, for example, the column name is converted by using a thesaurus, a rule or a learning model in the above-described step S8 shown in FIG. 8 and, for example, in the configuration in which the table name is converted by using a thesaurus in step S8, the conversion process using a thesaurus is also executed similarly in step S51. The conversion is also executed similarly in a case where a rule or a learning model is used in step S8.

When the process of step S51 is executed, the query analysis module 303 determines whether or not a column of the column name converted in step S51 (i.e., the column name acquired after the conversion) exists in the columns configuring the foreign tables already created in the data virtualization device 30 (step S52). The process of step S50 is executed based on whether or not the foreign table information (foreign column information) including the column name acquired after the conversion in step S51 as the column name of the column configuring the foreign table exists in the storage module 301.

When it is determined that the column exists (YES in step S52), the query analysis module 303 replaces the column name included in the data acquisition query acquired in step S31 with the column name acquired after the conversion in step S51 (step S53).

In contrast, when it is determined that the column does not exist (NO in step S52), the process of step S53 is not executed (i.e., the column name included in the data acquisition query is not changed).

In the present embodiment, a data acquisition query in which the table name and column names included in the data acquisition query are converted can be created by executing the processes as shown in FIG. 22.

The data acquisition query thus created is executed by the query execution module 305 and the data based on the data acquisition query is acquired from each data source 10 via the foreign table, which is omitted in FIG. 22.

When it is determined that the foreign table exists in the above-described step S45 (YES in step S45), the table name included in the data acquisition query is not converted and the process of step S50 is executed.

In addition, when it is determined that the column exists in the above-described step S50 (YES in step S50), the column name included in the data acquisition query is not converted and the processes shown in FIG. 22 are ended.

In the present embodiment, as described above, for example, when the data acquisition query (i.e., the query for acquiring the data of the source table) is specified at the client terminal 20, the table name (first table name) or column name (first column name) included in the query is converted.

In the present embodiment, by such a configuration, for example, even when a user who specifies the data acquisition query does not accurately recognize the table name and column name of the foreign table (i.e., the table name and column name of the foreign table converted from the table name and column name of the source table), the user can appropriately acquire the data based on the data acquisition query including the table name and column name acquired after the conversion by converting the table name and column name included in the data acquisition query into the table name and column name whose meanings are the same.

Figure 23:
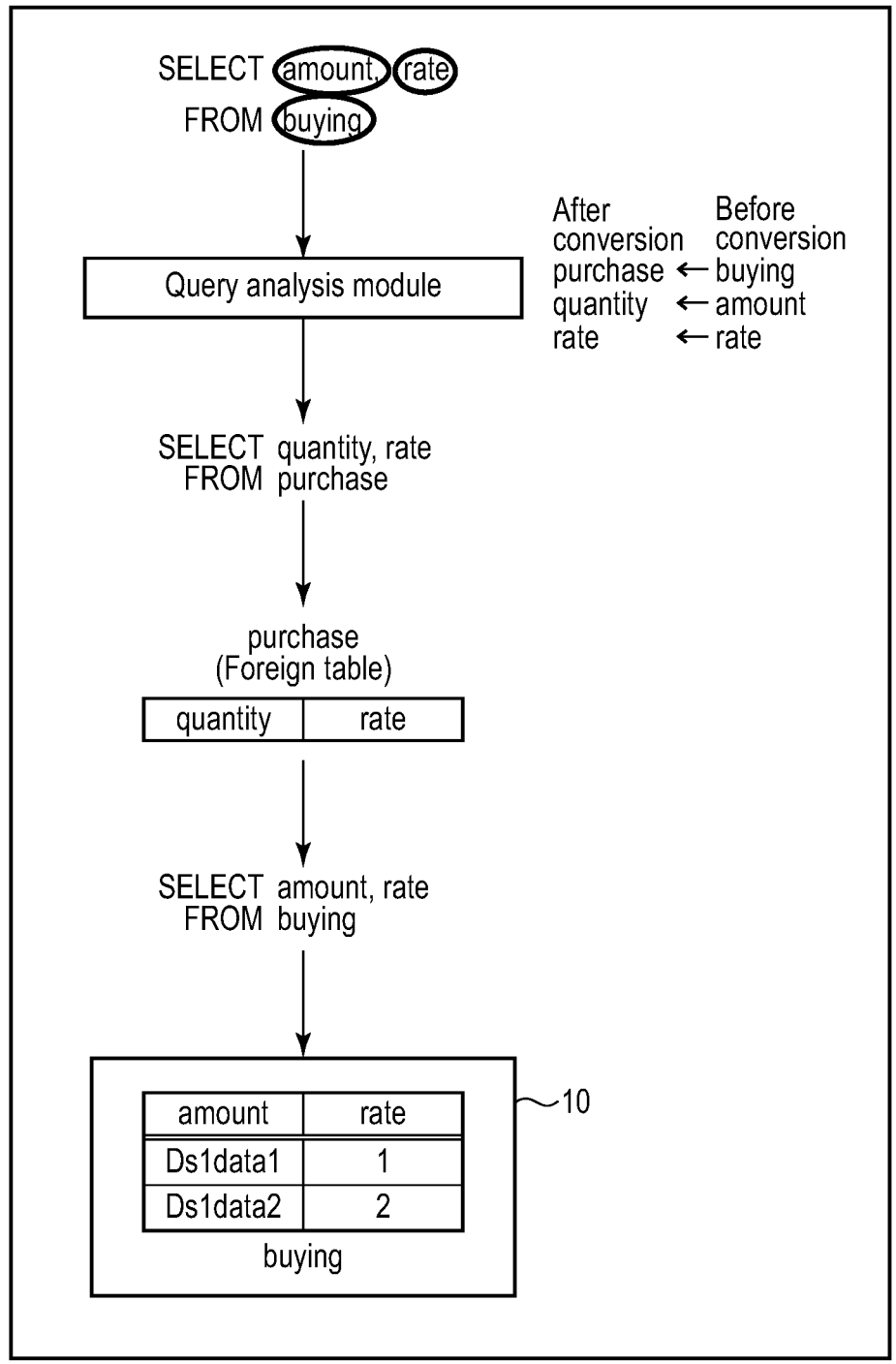
FIG. 23 is a diagram illustrating an advantage of the embodiment.

It is assumed that, as shown in FIG. 23, a source table which has a table name "purchase" and which is composed of columns having column names "amount" and "rate" is managed in the data source 10 and that a foreign table having a table name "purchase" and which is composed of columns having column names "quantity" and "rate" is created by converting the table name and the column names as described above in the first embodiment.

In this case, it is assumed that a data acquisition query "SELECT amount, rate FROM buying" is specified at the client terminal 20. In this case, in the data acquisition query "SELECT amount, rate FROM buying" (i.e., the data acquisition query including the table name "buying" and the column names "amount" and "rate"), an error is returned to the data acquisition query since the above-described foreign table cannot be referred to.

In the present embodiment, however, since the data acquisition query "SELECT quantity, rate FROM purchase" can be acquired by converting the table name "buying" included in the data acquisition query to "purchase" and converting the column name "amount" included in the data acquisition query to "quantity", it is possible to refer to the foreign table by using the data acquisition query and acquire appropriate data from the data source 10 by using the foreign table information on the foreign table.

In the present embodiment, the configuration that the second conversion module 311 is added to the data virtualization apparatus 30 according to the first embodiment has been described, but the present embodiment may be applied to the above-described second embodiment. That is, the present embodiment may include a configuration that the second conversion module 311 is added to the data virtualization device 30 according to the above-described second embodiment.

Fourth Embodiment

Next, a fourth embodiment will be described. Since a network configuration of a data virtualization system of the present embodiment is the same as that of the above-described first embodiment, the network configuration will be described as appropriate with reference to FIG. 1. The data virtualization device 30 of the present embodiment is similar to the above-described second embodiment in including the multi-tenant function, but different from the second embodiment in creating a multi-tenant table from the plurality of foreign tables based on the similarity of (configurations of) the plurality of foreign tables.

FIG. 24 is a block diagram showing an example of a functional configuration of the data virtualization apparatus 30 according to the embodiment. In FIG. 24, the same portions as those in FIG. 15 described above are denoted by the same reference numerals and detailed descriptions thereof are omitted, and the portions different from those in FIG. 15 are mainly described.

As shown in FIG. 24, the data virtualization apparatus 30 of the present embodiment includes a similarity determination module 312.

In the present embodiment, it is assumed that some or all parts of the similarity determination module 312 are realized by causing the CPU 31 provided in the data virtualization apparatus 30 (i.e., the computer of the data virtualization apparatus 30) to execute a predetermined program, i.e., by software. It has been described that some or all parts of the above-described similarity determination module 312 are realized by software but, for example, some or all parts of the similarity determination module 312 may be realized by hardware or may be realized as a combined configuration of software and hardware.

The similarity determination module 312 includes a function of calculating the similarity of the plurality of foreign tables created in the data virtualization device 30 and determining whether or not the plurality of foreign tables are similar based on the similarity.

The operations of the data virtualization apparatus 30 of the present embodiment will be described below. First, an outline of operations of the data virtualization apparatus 30 upon creating a multi-tenant table will be described with reference to FIG. 25.

It is assumed that the schema information acquisition module 307 acquires the schema information including the table name "purchase" and the column names "values", "prices", and "spare" from the data source 10 managing a source table (hereinafter referred to as a first source table) which has a table name "purchase" and which is composed of columns having column names "values", "prices", and "spare".

In addition, it is assumed that the schema information acquisition module 307 acquires the schema information including the table name "buying" and the column names "amount", "rate", and "flag" from the data source 10 managing a source table (hereinafter referred to as a second source table) which has a table name "buying" and column names "amount", "rate", and "flag".

Figure 25:
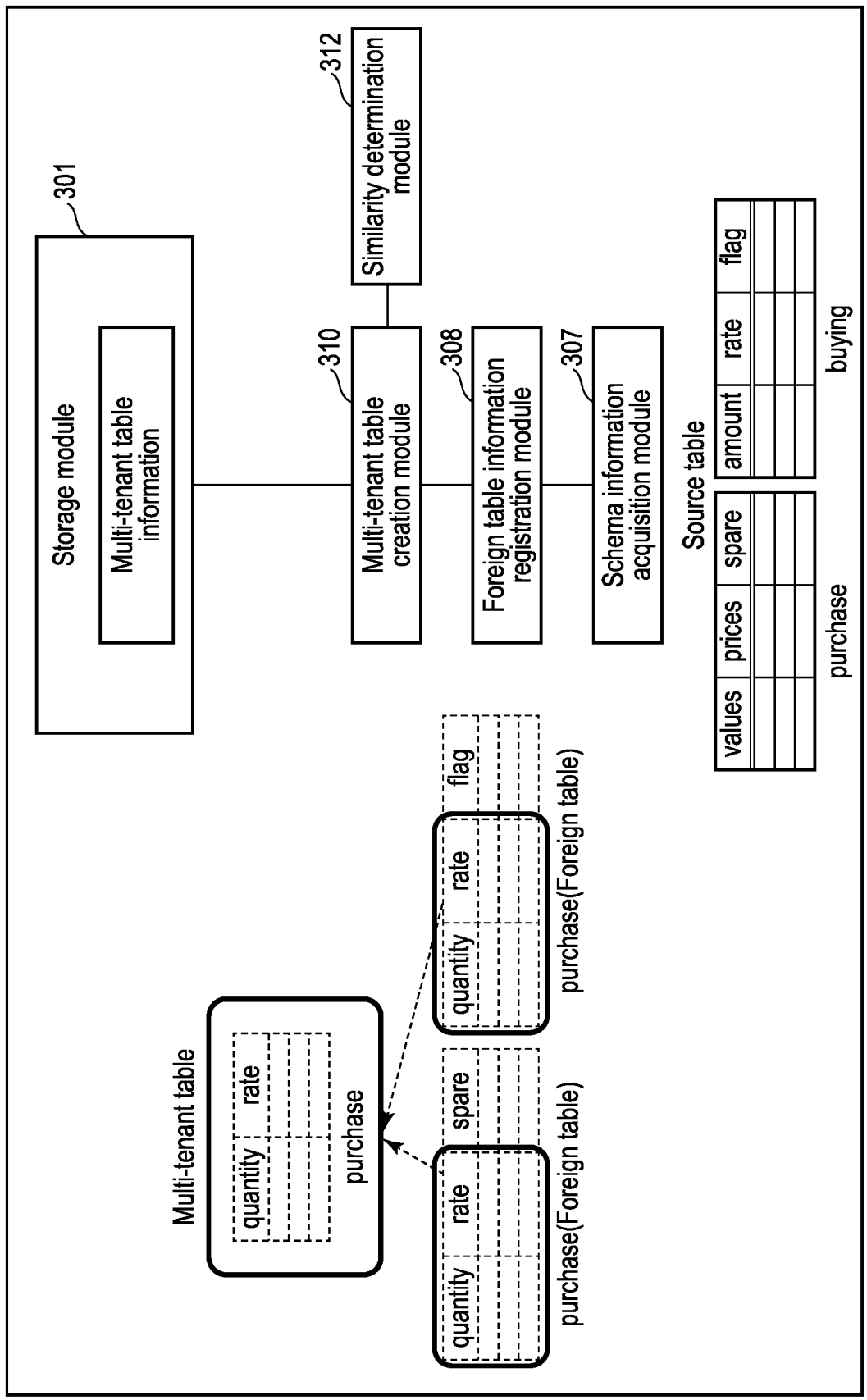
FIG. 25 is a diagram illustrating an outline of operations of the data virtualization apparatus upon creating a multi-tenant table.

In this case, the table name and the column names included in the above-described schema information are converted by the conversion module 309, and a foreign table is created based on the converted table name and column names, which is omitted in FIG. 25.

In the example shown in FIG. 25, a table having a table name "purchase" and which is composed of columns having column names "quantity", "rate", and "spare" is created as a foreign table (hereinafter referred to as a first foreign table) corresponding to the above-described first source table.

In addition, a table which has a table name "purchase" and which is composed of columns having column names "quantity" and "rate" is created as a foreign table (hereinafter referred to as a second foreign table) corresponding to the above-described second source table.

In the present embodiment, the similarity determination module 312 compares the above-described configuration of the first foreign table (column names of the columns configuring the first foreign table) with the configuration of the second foreign table (column names of the columns configuring the second foreign table), and calculates the similarity between the first and second foreign tables. Details of the process of calculating the similarity by the similarity determination module 312 will be described later and, when the similarity is larger than or equal to a predetermined value (hereinafter referred to as a threshold value), the multi-tenant table creation module 310 integrates the first and second foreign tables and creates a multi-tenant table.

As described above, the first foreign table is composed of the columns having the column names "quantity", "rate", and "spare", and the second foreign table is composed of the columns having the column names "quantity", "rate", and "flag" but, in the example shown in FIG. 25, the multi-tenant table created from the first and second foreign tables is composed of, for example, columns having column names "quantity" and "rate" (i.e., columns common to the first and second foreign tables).

However, the multi-tenant table created from the first and second foreign tables may be composed of, for example, columns having column names "quantity", "rate", "spare" and "flag" (i.e., all columns configuring the first and second foreign tables).

When the multi-tenant table is created by the multi-tenant table creation module 310 as described above, the multi-tenant table information on the multi-tenant table is registered in the storage module 301.

Figure 26:
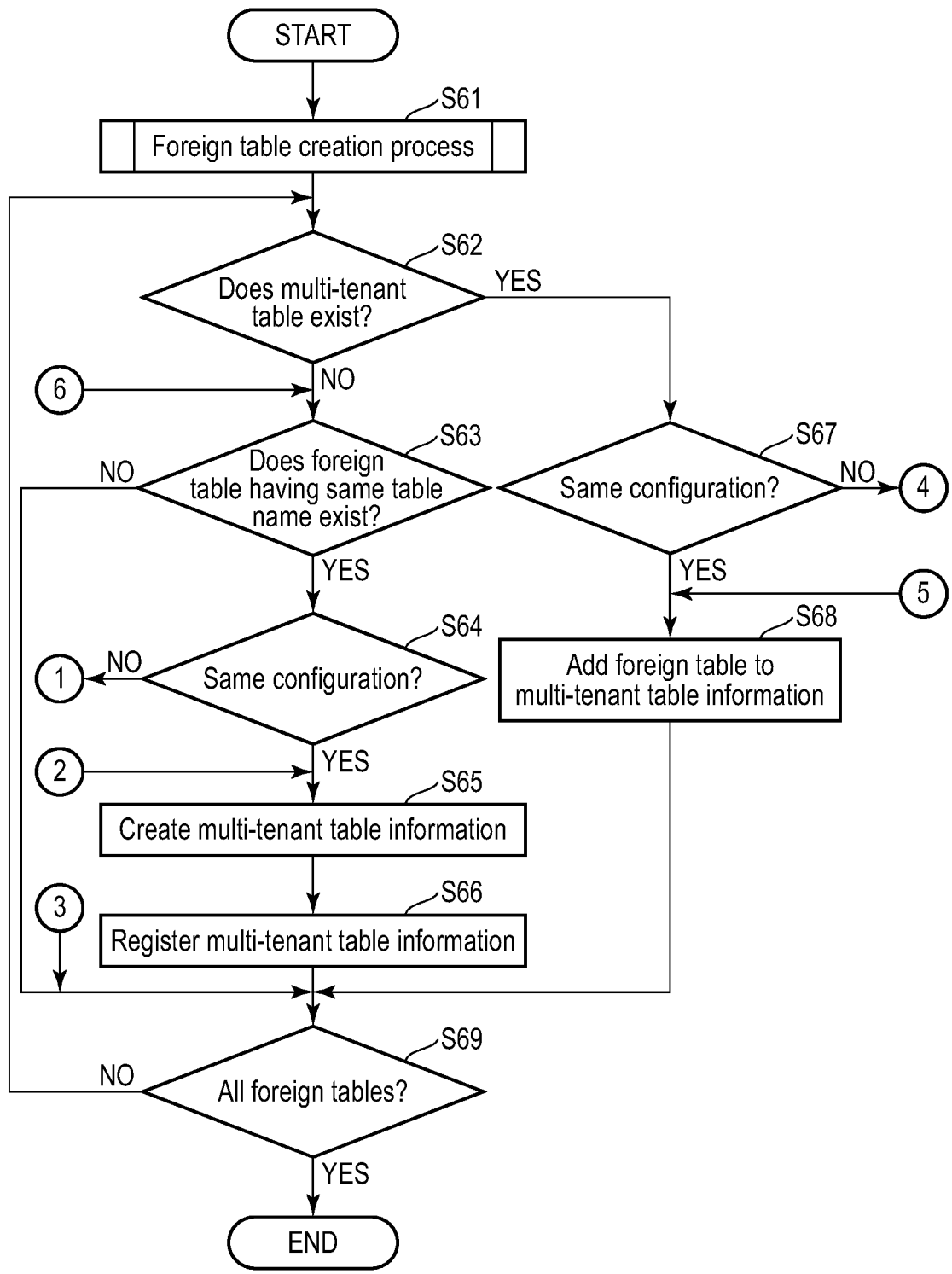
FIG. 26 is a flowchart showing an example of a procedure of the data virtualization apparatus upon creating a multi-tenant table.

Next, an example of the procedure of the data virtualization apparatus 30 upon creating the multi-tenant table will be described with reference to flowcharts of FIG. 26 to FIG. 28.

In the present embodiment, processes in steps S61 to S69 corresponding to the above-described processes in steps S31 to S39 shown in FIG. 17 are executed.

In the present embodiment, however, when it is determined in step S64 that the configuration of the existing foreign table is not the same as the configuration of the target foreign table, a process of determining whether or not the configuration of the target foreign table is similar to the configuration of the existing foreign table is further executed.

More specifically, the similarity determination module 312 specifies a first column number, based on the foreign table information (foreign column information) on the target foreign table and the foreign table information (foreign column information) on the existing foreign table (step S70). The first column number is the number of columns whose column names are common on the target foreign table and the existing foreign table. That is, the first column number corresponds to, for example, the number of "columns configuring the target foreign table ∩ columns configuring the existing foreign table".

When the process of step S70 is executed, the similarity determination module 312 specifies a second column number, based on the foreign table information (foreign column information) on the target foreign table and the foreign table information (foreign column information) on the existing foreign table (step S71). The second column number is specified by summing up the number of columns configuring the target foreign table and the number of columns configuring the existing foreign table, and subtracting from the summed number of columns the number of columns whose column names are common on the target foreign table and the existing foreign table (i.e., the first column number specified in above-described step S70). That is, the second column number corresponds to, for example, the number of "columns configuring the target foreign table ∩ columns configuring the existing foreign table".

Next, the similarity determination module 312 calculates the similarity between the target foreign table and the existing foreign table, based on the above-described first and second column numbers (step S72). In step S62, the similarity is calculated by, for example, "first column number/ second column number×100".

The similarity determination module 312 determines whether or not the similarity calculated in step S72 is larger than or equal to the threshold value (step S73).

When it is determined that the similarity is larger than or equal to the threshold value (YES in step S73), the processes of steps S65 and S66 are executed.

Thus, in the present embodiment, the multi-tenant table can be created by integrating a plurality of foreign tables whose similarity is larger than or equal to the threshold value. The multi-tenant table created in this case may be composed of columns that are common on the target foreign table and the existing foreign table or may be composed of all the columns that configure the target foreign table and the existing foreign table.

When it is determined that the similarity is not larger than or equal to the threshold value (NO in step S73), the process of step S69 is executed.

The process executed when it is determined in step S64 that the configuration of the existing foreign table is not the same as that of the target foreign table has been described, and the same process is also executed when it is determined in step S67 that the configuration of the existing multi-tenant table is not the same as that of the target foreign table.

More specifically, the similarity determination module 312 specifies the first column number, based on the foreign table information (foreign column information) on the target foreign table and the multi-tenant table information on the existing multi-tenant table (step S74). The first column number is the number of columns whose column names are common on the target foreign table and the existing multi-tenant table.

When the process of step S74 is executed, the similarity determination module 312 specifies the second column number, based on the foreign table information (foreign column information) on the target foreign table and the multi-tenant table information on the existing multi-tenant table (step S75). The second column number is specified by summing up the number of columns configuring the target foreign table and the number of columns configuring the existing multi-tenant table, and subtracting from the summed number of columns the number of columns whose column names are common on the target foreign table and the existing multi-tenant table (i.e., the first column number specified in step S76 described above).

Next, the similarity determination module 312 calculates the similarity between the target foreign table and the existing multi-tenant table, based on the above-described first and second column numbers (step S76). The similarity in step S76 is calculated by, for example, "first column number/second column number×100" as described above in step S72.

The similarity determination module 312 determines whether or not the similarity calculated in step S76 is larger than or equal to the threshold value (step S77).

When it is determined that the similarity is larger than or equal to the threshold value (YES in step S77), the process of step S68 is executed. In the case where the configuration of the multi-tenant table is changed by integrating the target foreign table as described above (i.e., the column configuring the target foreign table is added to the column configuring the multi-tenant table), the process of adding the column to the multi-tenant table information on the multi-tenant table is executed, which is omitted in FIG. 26. Incidentally, "adding the column to the multi-tenant table information" means changing (updating) the multi-tenant table information such that the column is included as a column that configures the multi-tenant table.

Thus, in the present embodiment, the foreign table whose similarity to the existing multi-tenant table is larger than or equal to the threshold value can be further integrated (added) to the existing multi-tenant table.

When it is determined that the similarity is not larger than or equal to the threshold value (NO in step S77), the process of step S63 is executed. It has been described that the process of step S63 is executed when it is determined that the similarity is not larger than or equal to the threshold value but, for example, the process of step S69 may be executed.

As described above, the present embodiment is configured to create the multi-tenant table, for example, based on the similarity between a plurality of columns configuring the first foreign table and a plurality of columns configuring the second foreign table.

The advantages of the present embodiment will be described in comparison with the above-described second embodiment by referring to FIG. 29 and FIG. 30.

Figure 29:
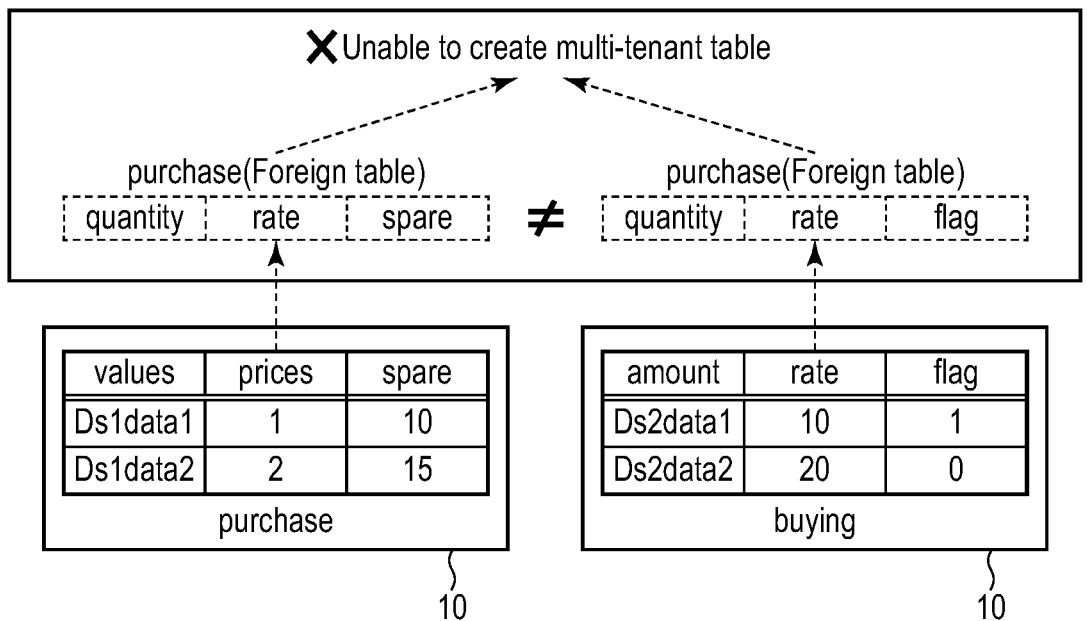
FIG. 29 is a diagram illustrating an advantage of the embodiment.

It is assumed that as shown in FIG. 29, for example, a first source table which has a table name "purchase" and which is composed of columns having column names "values", "prices", and "spare" is managed in the first data source 10. In this case, a table which has a table name "purchase" and which is composed of columns having column names "quantity", "rate", and "spare" is created as a foreign table (hereinafter referred to as a first foreign table) corresponding to the first source table.

In addition, for example, a second source table which has a table name "purchase" and which is composed of columns having column names "amount", "rate", and "flag" is created in the second data source 10. In this case, a table which has a table name "purchase" and which is composed of columns having column names "quantity", "rate", and "flag" is created as a foreign table (hereinafter referred to as a second foreign table) corresponding to the second source table.

In this case, in the above-described second embodiment, even when the multi-tenant table is to be created by integrating the above two foreign tables (first and second foreign tables), the configurations of the two foreign tables are different (i.e., the column names of the columns configuring the foreign tables do not match) while the table names match, and a multi-tenant table therefore cannot be created. That is, the plurality of data sources 10 including the first and second data sources 10 often have different configurations of the source tables managed in the plurality of data sources due to different vendors and, in such a case, the multi-tenant table cannot be created in the above-described second embodiment.

Figure 30:
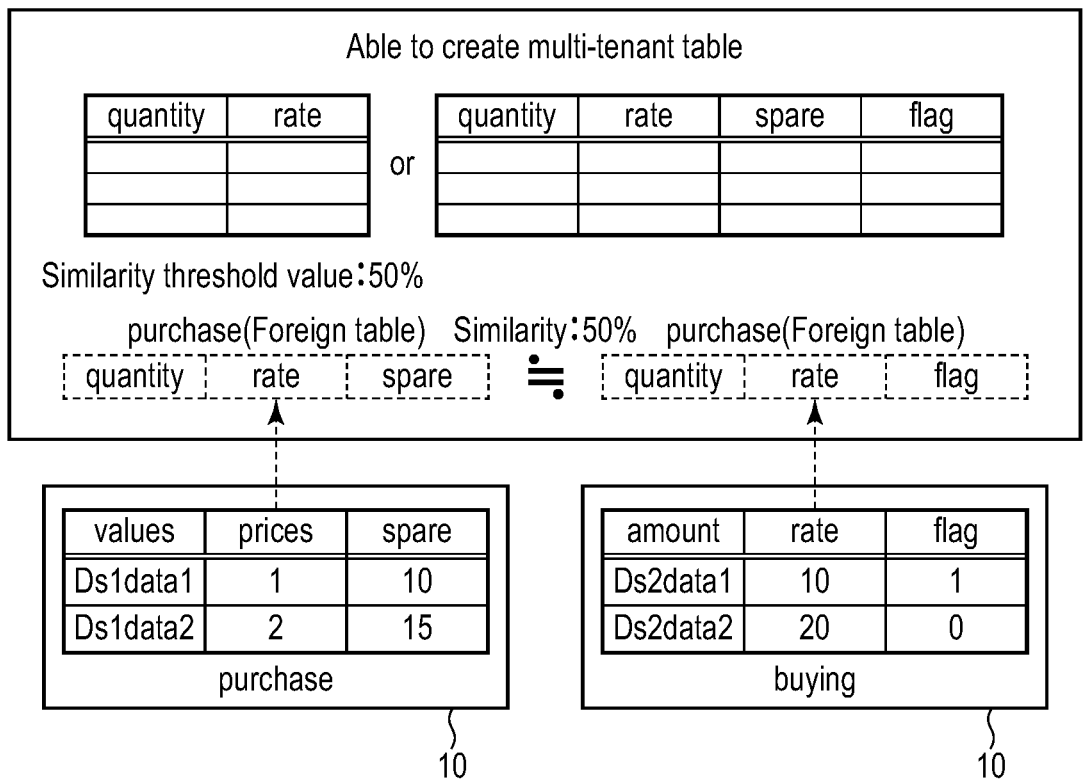
FIG. 30 is a diagram illustrating an advantage of the embodiment.

In contrast, in the present embodiment, as shown in FIG. 30, the similarity between the first and second foreign tables is calculated and, when the similarity is larger than or equal to the threshold value, the first and second foreign tables are integrated, and the multi-tenant table can be thereby created.

In the example shown in FIG. 30, since the above-mentioned first column number (the number of columns whose column names are common to the first and second foreign tables) is 2 and since the second column number (the number obtained by subtracting the first column number from the total number of columns configuring the first and second foreign tables) is 4, the similarity between the first and second foreign tables is 50%. In this case, if the threshold value is set to, for example, 50%, a multi-tenant table whose column names are "quantity" and "rate" or a multi-tenant table whose column names are "quantity", "rate", "spare", and "flag" can be created from the first and second foreign tables.

In the present embodiment, the configuration that the similarity determination module 312 is added to the data virtualization apparatus 30 of the above-described second embodiment has been described, but the present embodiment may be combined with the above-described third embodiment. That is, the data virtualization apparatus 30 of the present embodiment may be configured to include the second conversion module 311 described in the above-described third embodiment.

Fifth Embodiment

Next, a fifth embodiment will be described. Since a network configuration of a data virtualization system of the present embodiment is the same as that of the above-described first embodiment, the network configuration will be described as appropriate with reference to FIG. 1.

It has been described that the foreign table is created using a thesaurus in the above-described first embodiment, and the present embodiment is different from the first embodiment in automatically creating the thesaurus.

Figure 31:
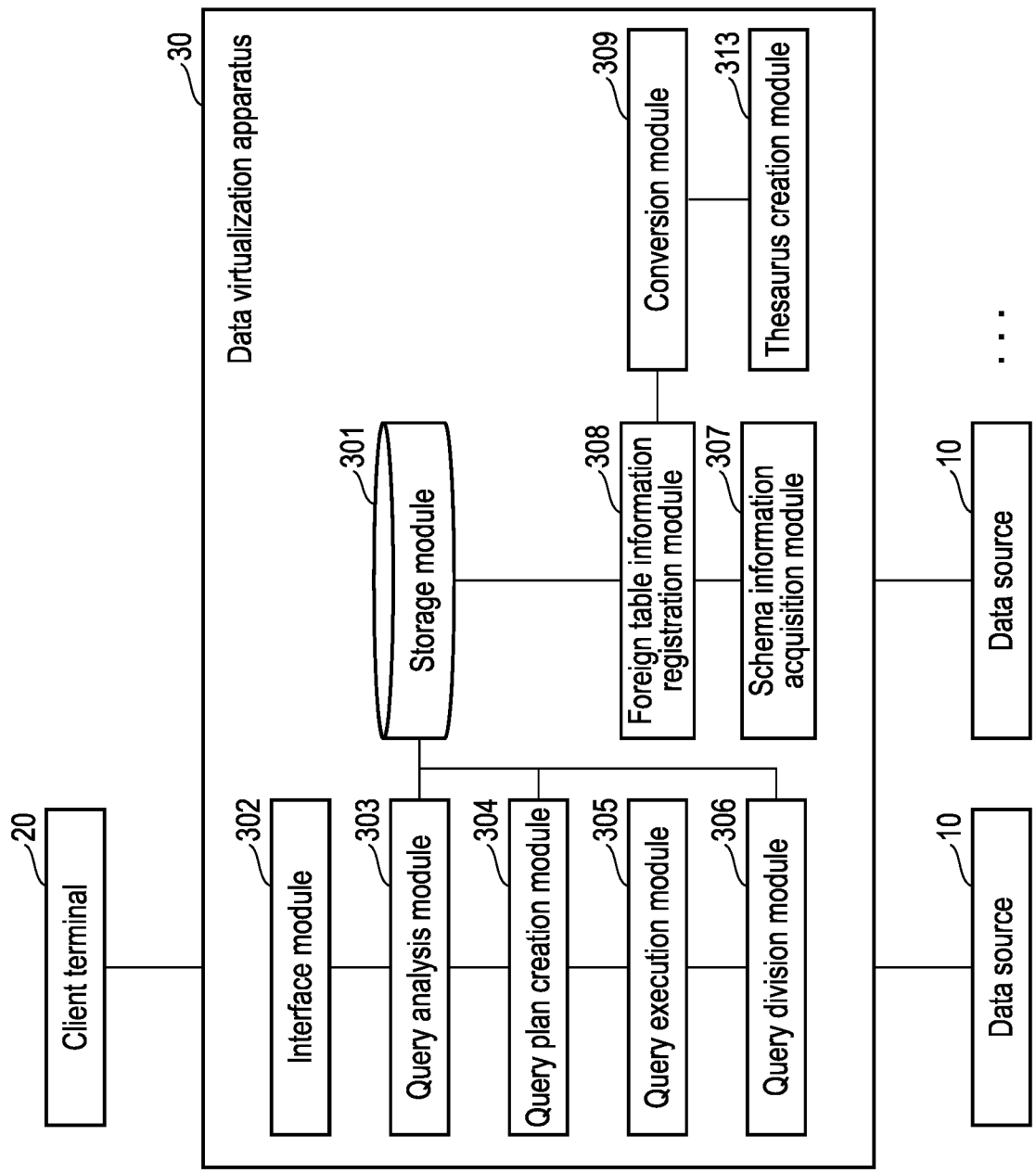
FIG. 31 is a block diagram showing an example of a functional configuration of the data virtualization apparatus according to a fifth embodiment.

FIG. 31 is a block diagram showing an example of a functional configuration of a data virtualization apparatus 30 of the present embodiment. In FIG. 31, the same portions as those in FIG. 6 described above are denoted by the same reference numerals and detailed descriptions thereof are omitted, and the portions different from those in FIG. 6 are mainly described.

As shown in FIG. 31, the data virtualization device 30 of the present embodiment includes a thesaurus creation module 313.

In the present embodiment, it is assumed that some or all parts of the thesaurus creation module 313 are realized by causing the CPU 31 provided in the data virtualization apparatus 30 (i.e., the computer of the data virtualization apparatus 30) to execute a predetermined program, i.e., by software. It has been described that some or all parts of the above-described thesaurus creation module 313 are realized by software but, for example, some or all parts of the thesaurus creation module 313 may be realized by hardware or may be realized as a combined configuration of software and hardware.

The thesaurus creation module 313 includes a function of automatically creating a thesaurus that is used in creating the above-described foreign table. For example, the thesaurus creation module 313 analyzes a website (web page) searched based on a domain designated by a user and creates a thesaurus on the domain, based on a word extracted from the Web site.

The operations of the data virtualization apparatus 30 of the present embodiment will be described below. First, an outline of the operations of the data virtualization apparatus 30 upon creating a thesaurus will be described with reference to FIG. 32.

When creating a thesaurus, for example, a user can operate a client terminal 20 to specify a domain on a domain specification screen displayed on the client terminal 20. In the present embodiment, the domain specified by the user includes, for example, a keyword indicating a field of the thesaurus.

When the domain (keyword) is specified by the user, a website related to the domain is searched and crawling is executed on the search result. The term "crawling" refers to patrolling a website.

Next, by scraping the crawled website, words (groups) are extracted from the website, and a list of words described in the website (i.e., a list of words related to the domain specified by the user) is acquired.

The number of times of appearance (appearance frequency) of each of the words is acquired from the list of words thus acquired, and a list of frequently used words is created based on the number of times of appearance.

It is assumed that the data virtualization device 30 holds a concept dictionary (semantic dictionary). It is assumed that in this concept dictionary, a set of words having the same or similar meanings is defined.

In the present embodiment, synonyms of the above-mentioned frequently used words are searched using such a concept dictionary, and the frequently used words are registered as representative words and the search results are registered as synonyms of the representative words in the thesaurus.

According to the example described in the above first embodiment, for example, when a frequently used word extracted from a website is "purchase" and then "buying", "purchasing" and the like are searched from a concept dictionary as synonyms of "purchase", a thesaurus is created in which the representative word "purchase" and the synonyms "buying" and "purchasing" are registered in association with each other, which will not be described in detail.

In the present embodiment, it is possible to automatically create a thesaurus in which a plurality of representative words are registered can be automatically created by executing such a process for each of the frequently used words.

Figure 33:
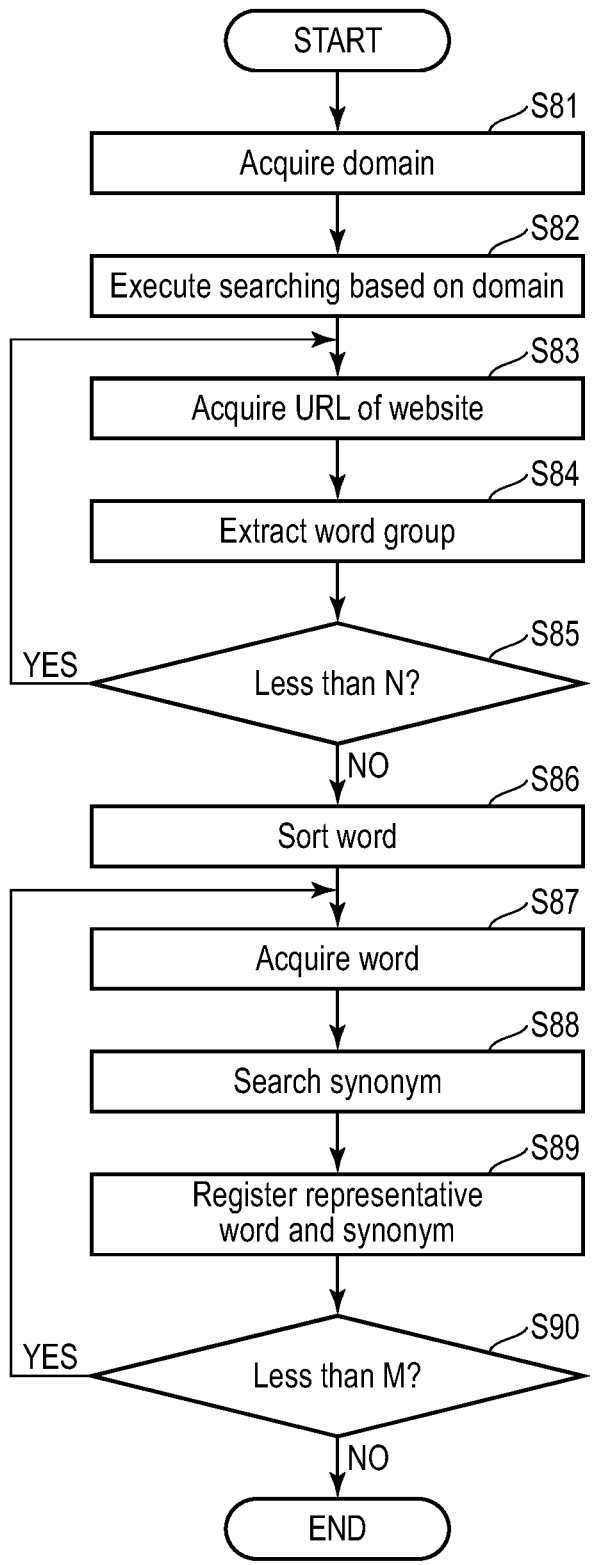
FIG. 33 is a flowchart showing an example of a procedure of the data virtualization apparatus upon creating a thesaurus.

Next, an example of the procedure of the data virtualization apparatus 30 (thesaurus creation module 313) upon creating the thesaurus will be described with reference to a flowchart of FIG. 33.

First, for example, when a domain is specified by the user, the thesaurus creation module 313 acquires the domain (step S81). In the present embodiment, the domain is specified by the user, but the domain may be automatically specified based on, for example, information of the source table managed in the data source 10 (for example, a table name and a column name of a column configuring the table), data held in the table, or the like.

Next, the thesaurus creation module 313 executes a web search based on the domain acquired in step S81 (step S82). The process of step S82 may be executed using a predetermined search engine.

When the process of step S82 is executed, uniform resource locators (URLs) of a plurality of websites are acquired as search results in step S82. The thesaurus creation module 313 acquires one of the URLs of the plurality of websites thus acquired (step S83).

The thesaurus creation module 313 accesses a website based on the URL acquired in step S83, and extracts a word group from the website by analyzing the website (step S84).

For example, when extracting words (groups) from N websites (i.e., executing the processes of steps S83 and S84 N times) to create a thesaurus is assumed, the thesaurus creation module 313 determines whether or not the number of times of the processes is less than N times (step S85). N (times) may be predetermined in the data virtualization device 30 (or the thesaurus creation module 313) but may be specified by a user together with the above-mentioned domain.

When it is determined that the number of times is less than N (YES in step S85), the flow returns to step S83 to repeat the processes. In this case, a URL different from the URLs of the websites from which the word groups have already been extracted is acquired in step S83, and the process of step S84 is executed.

In contrast, when it is determined that the number of times is not less than N (i.e., the process has been executed N times) (NO in step S85), the thesaurus creation module 313 sorts the plurality of words (word groups) extracted in step S84 that have been repeatedly executed N times, based on the number of appearances of each of the words (step S86). A list of the above-mentioned frequently used words is acquired by executing the process of step S86.

After that, the word having the highest number of appearances (hereinafter referred to as a target word) is acquired from the list of frequently used words acquired by executing the process of step S86 (step S87).

When the process of step S87 is executed, the thesaurus creation module 313 searches a synonym of the target word from the concept dictionary, based on the target word acquired in step S87 (step S88).

The thesaurus creation module 313 registers the target word acquired in step S87 as a representative word and the search result acquired by executing the process of step S88 as a synonym of the target word, and registers the representative word and the synonym in association with each other in the thesaurus (step S89).

For example, when it is assumed that M representative words are registered in the thesaurus to create the thesaurus, the thesaurus creation module 313 determines whether or not the number of representative words registered in the thesaurus is less than M (step S90). The M (number) may be predetermined in the data virtualization device 30 (or the thesaurus creation module 313) or may be specified by the user together with the above-mentioned domain.

When it is determined that the number of representative words is less than M (YES in step S90), the flow returns to step S87 and the processes are repeated. In this case, the word with the next highest number of appearances to the above-mentioned target word is acquired as the target word in step S87, and processes of steps S88 and S89 are executed.

When the word acquired in step S87 has already been registered as a synonym in step S89, the processes for the word are omitted.

As described above, in the present embodiment, a thesaurus is created based on the words extracted from the websites (web pages) searched based on the domains specified by the user. More specifically, in the present embodiment, the thesaurus is created by registering the words with a large number of appearances and the synonyms of the words in the thesaurus.

In the present embodiment, since a thesaurus can be automatically created by such a configuration, a thesaurus used to create the foreign table does not need to be prepared in advance. In addition, in the present embodiment, since a thesaurus specialized for the domain specified by the user can be created, it is possible to achieve conversion of table names and column names intended by the user when creating the foreign table.

In the present embodiment, for example, a concept dictionary is held in the data virtualization device 30 in advance but, since a set of synonyms is merely defined and the representative words are not defined in the concept dictionary, the concept dictionary cannot be used as a thesaurus for creating the foreign table.

For this reason, in the present embodiment, the thesaurus can be created by using the words with a high frequency of appearances, of the word group extracted from the website searched based on the domain specified by the user, as the representative words, and by searching the synonyms of the representative words in the concept dictionary.

In the present embodiment, creating the thesaurus by using the concept dictionary (i.e., the dictionary in which a set of synonyms is defined) has been described but synonyms necessary to create the thesaurus may be acquired by, for example, web search or the like.

In addition, in the present embodiment, the configuration that the second conversion module 311 is added to the data virtualization apparatus 30 of the above-described first embodiment has been described, but the present embodiment may be applied to the above-described second to fourth embodiments. That is, the present embodiment may include a configuration that the second conversion module 311 is added to the data virtualization device 30 according to the above-described second to fourth embodiments.

According to at least one of the above-described embodiments, a data virtualization apparatus and method capable of realizing efficient access to tables managed in a plurality of data sources can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A data virtualization apparatus connected to first and second data sources, the apparatus comprising:
a memory; and
a processor configured to:
acquire first schema information including a first table name of a first source table managed in the first data source, and second schema information including a second table name of a second source table managed in the second data source;
convert the first table name included in the acquired first schema information into a third table name, and convert the second table name included in the acquired second schema information into the third table name;
register first table correspondence information including the first table name and the third table name converted from the first table name in association with each other, in the memory, to create a first foreign table corresponding to the first source table, and register second table correspondence information including the second table name and the third table name converted from the second table name in association with each other, in the memory, to create a second foreign table corresponding to the second source table; and acquire data from the first and second data sources based on the first and second table correspondence information when the third table name is specified in a data acquisition query.

2. The apparatus of claim 1, wherein
the first schema information includes a first column name of a first column configuring the first source table,
the second schema information includes a second column name of a second column configuring the second source table, and
the processor is further configured to:
convert the first column name included in the acquired first schema information into a third column name, and convert the second column name included in the acquired second schema information into the third column name; and
register, in the memory, first source column information including the first table name and the first column name in association with each other, and first foreign column information including the third table name converted from the first table name and the third column name converted from the first column name in association with each other, and register, in the memory, second source column information including the second table name and the second column name in association with each other, and second foreign column information including the third table name converted from the second table name and the third column name converted from the second column name in association with each other.

3. The apparatus of claim 2, wherein
the third table name is a synonym of the first table name and the second table name, and
the third column name is a synonym of the first column name and the second column name.

4. The apparatus of claim 2, wherein
the processor is further configured to, referring to a thesaurus in which a plurality of representative words and synonyms of the respective representative words are registered in association with each other, convert the first table name into the third table name by using as the third table name a representative word registered in the thesaurus in association with the first table name, convert the first column name into the third column name by using as the third column name a representative word registered in the thesaurus in association with the first column name, convert the second table name into the third table name by using as the third table name a representative word registered in the thesaurus in association with the second table name, and convert the second column name into the third column name by using as the third column name a representative word registered in the thesaurus in association with the second column name.

5. The apparatus of claim 4, wherein the processor is further configured to create the thesaurus, based on words extracted from a web page searched based on a domain specified by a user.

6. The apparatus of claim 5, wherein the processor is further configured to register a word with a highest number of times of appearances, of the extracted words, and a synonym of the word in the thesaurus.

7. The apparatus of claim 2, wherein
the processor is further configured to convert the first table name into the third table name, convert the first column name into the third column name, convert the second table name into the third table name, and convert the second column name into the third column name, by using a rule of correcting spelling inconsistency in the table names and the column names.

8. The apparatus of claim 2, wherein
the processor is further configured to convert the first table name into the third table name, convert the first column name into the third column name, convert the second table name into the third table name, and convert the second column name into the third column name, by using a learning model to be caused to learn to input a table name and a column name and output synonyms of the table name and the column name.

9. The apparatus of claim 2, wherein
the processor is further configured to create a multi-tenant table in which the first and second foreign tables are integrated, based on the first and second foreign column information.

10. The apparatus of claim 9, wherein
the first foreign table comprises a plurality of columns including the third column of the third column name converted from the first column name,
the second foreign table comprises a plurality of columns including the third column of the third column name converted from the first column name, and
the processor is further configured to create the multi-tenant table, based on similarity between the plurality of columns configuring the first foreign table, and the plurality of columns configuring the second foreign table.

11. The apparatus of claim 2, wherein
the processor is further configured to, when a query for acquiring data held in the first source table is specified, convert the first table name of the first source table included in the query into the third table name, and convert the first column name of the first column configuring the first source table included in the query into the third column name.

12. A method executed by a data virtualization apparatus connected to first and second data sources and equipped with a memory, the method comprising:
acquiring first schema information including a first table name of a first source table managed in the first data source, and second schema information including a second table name of a second source table managed in the second data source;
converting the first table name included in the acquired first schema information into a third table name, and converting the second table name included in the acquired second schema information into the third table name;
registering first table correspondence information including the first table name and the third table name converted from the first table name in association with each other, in the memory, to create a first foreign table corresponding to the first source table, and registering second table correspondence information including the second table name and the third table name converted from the second table name in association with each other, in the memory, to create a second foreign table corresponding to the second source table; and acquiring data from the first and second data sources based on the first and second table correspondence information when the third table name is specified in a data acquisition query.

* * * * *